(12) United States Patent
Stucky et al.

(10) Patent No.: US 9,728,344 B2
(45) Date of Patent: Aug. 8, 2017

(54) ENERGY STORAGE DEVICE INCLUDING A REDOX-ENHANCED ELECTROLYTE

(71) Applicants: Oregon State University, Corvallis, OR (US); The Regents of the University of California, Oakland, CA (US); University of Oregon, Eugene, OR (US)

(72) Inventors: Galen Stucky, Santa Barbara, CA (US); Brian Evanko, Goleta, CA (US); Nicholas Parker, Pasadena, CA (US); David Vonlanthen, Santa Barbara, CA (US); David Auston, Santa Barbara, CA (US); Shannon Boettcher, Eugene, OR (US); Sang-Eun Chun, Eugene, OR (US); Xiulei Ji, Corvallis, OR (US); Bao Wang, Corvallis, OR (US); Xingfeng Wang, Corvallis, OR (US); Raghu Subash Chandrabose, Corvallis, OR (US)

(73) Assignees: Oregon State University, Corvallis, OR (US); The Regents of the University of California, Oakland, CA (US); University of Oregon, Eugene, OR (US)

( * ) Notice: Subject to any disclaimer, the term of this patent is extended or adjusted under 35 U.S.C. 154(b) by 147 days.

(21) Appl. No.: 14/692,695

(22) Filed: Apr. 21, 2015

(65) Prior Publication Data
US 2016/0314906 A1 Oct. 27, 2016

Related U.S. Application Data

(60) Provisional application No. 61/982,236, filed on Apr. 21, 2014.

(51) Int. Cl.
*H01G 9/00* (2006.01)
*H01G 11/32* (2013.01)
(Continued)

(52) U.S. Cl.
CPC ............ *H01G 11/32* (2013.01); *H01G 11/02* (2013.01); *H01G 11/62* (2013.01); *H01G 11/04* (2013.01); *H01G 11/16* (2013.01)

(58) Field of Classification Search
CPC .................................................... H01G 11/62
(Continued)

(56) References Cited

U.S. PATENT DOCUMENTS 8,518,572 B2 * 8/2013 Kim .................... H01M 4/8896
29/623.5
9,196,425 B2 * 11/2015 Stucky .................. H01G 11/36
(Continued)

*Primary Examiner* — Eric Thomas
(74) *Attorney, Agent, or Firm* — Schwegman Lundberg & Woessner, P.A.

(57) ABSTRACT

An electrical double layer capacitor (EDLC) energy storage device is provided that includes at least two electrodes and a redox-enhanced electrolyte including two redox couples such that there is a different one of the redox couples for each of the electrodes. When charged, the charge is stored in Faradaic reactions with the at least two redox couples in the electrolyte and in a double-layer capacitance of a porous carbon material that comprises at least one of the electrodes, and a self-discharge of the energy storage device is mitigated by at least one of electrostatic attraction, adsorption, physisorption, and chemisorption of a redox couple onto the porous carbon material.

20 Claims, 16 Drawing Sheets

(51) Int. Cl.
*H01G 11/02* (2013.01)
*H01G 11/62* (2013.01)
*H01G 11/04* (2013.01)
*H01G 11/16* (2013.01)

(58) Field of Classification Search
USPC .......................................... 361/502; 29/25.03
See application file for complete search history.

(56) References Cited

U.S. PATENT DOCUMENTS

2011/0287316 A1* 11/2011 Lu .................... B82Y 30/00
429/215
2015/0062777 A1* 3/2015 Stucky .................. H01G 11/36
361/502

* cited by examiner

ENERGY STORAGE DEVICE INCLUDING A REDOX-ENHANCED ELECTROLYTE

CROSS-REFERENCE TO RELATED APPLICATION

This application claims the benefit of priority under 35 U.S.C. §119(e) to U.S. Provisional Patent Application Ser. No. 61/982,236, filed on Apr. 21, 2014, which is incorporated by reference herein in its entirety.

This application is related to U.S patent application Ser. No. 14/102,164, filed on Dec. 10, 2013, now U.S. Pat. No. 9,196,425, issued on Nov. 24, 2015, which application claims priority under 35 U.S.C. §119(e) to U.S. Provisional Patent Application Serial No. 61/873,459, filed on Sep. 4, 2013.

STATEMENT OF GOVERNMENT SPONSORED SUPPORT

This invention was made with Government support under grant (or contract) no. DE-AR0000344 awarded by the Advanced Research Projects Agency-Energy, Department of Energy (DOE) of the United States. The Government may have certain rights in this invention.

TECHNICAL FIELD

The present disclosure relates generally to energy storage devices. More particularly, the invention relates to energy storage devices including a redox-enhanced electrolyte.

BACKGROUND

An electric double-layer capacitor, also known as a "supercapacitor," "supercondenser," "pseudocapacitor," "electrochemical double layer capacitor" (EDLC)," or "ultracapacitor," (hereinafter referred to as an "EDLC") is an electrochemical capacitor that has an unusually high energy density when compared to common capacitors. EDLCs can have long cycle life and fast recharging times suitable to provide sufficient power demanded for heavy-duty electronics and electric vehicles. Multiple power applications favorably harness the high power of EDLCs instead of batteries with lower power output.

In a battery, solid-state Faradaic processes often lead to poor cycling reversibility and limited power performance. EDLCs are based upon the electrochemical double layer phenomenon at the interface between a polarized electrode and a liquid electrolyte. An EDLC can include two electrochemical double layers linked in series by an electrolyte bridge. Operation of EDLCs can involve neither interelectrode mass transfer nor solid-state ion diffusion, which can lead to long cycling life and high-power.

Significant progress has been made to EDLCs in terms of power densities and physical flexibility. Unfortunately, the low energy densities of current EDLCs, generally about <5 Watt hour per kilogram (Wh/kg), seriously limit the applications of the EDLC.

SUMMARY

The present inventors recognize, among other things, that increasing the energy density of EDLCs while decreasing the cost of manufacture can be beneficial. The devices and methods of the present disclosure can decrease the cost to manufacture the EDLC while improving the energy density.

For example, the EDLC of the present disclosure can include a redox-enhanced electrolyte having two redox couples and two electrodes (e.g., a positive electrode and a negative electrode). As discussed herein, when the redox couples become charged, the solubility of the redox couples change. For example, when a first redox couple becomes charged, the first redox couple can adsorb to the surface of a first electrode and when a second redox couple becomes charged, the second redox couple can adsorb to the surface of a second electrode, such that the self-discharge of the EDLC is minimized (e.g., prevented) and the EDLC can be fabricated without the use of an ion-selective membrane separator.

As discussed herein, current EDLCs can exhibit high power and long cycle life, but have low energy density compared to batteries, which can limit the application of EDLCs. High power density and long-term cycle stability, e.g., in load leveling and in electric vehicles, can be enabled by a double-layer charging mechanism which relies only on physical ion adsorption/desorption in the Helmholtz layer of the liquid electrolyte and does not require driving slower solid-state ion insertion/de-insertion reactions as in, e.g., lithium ion batteries, which also leads to electrode volume change and thus capacity fade with cycling.

Current EDLCs can use organic electrolytes to enable operation at voltages around, for example, about 3 Volts (V). The disadvantages of current EDLCs can include (1) low-to moderate volumetric and gravimetric energy density (e.g., about <10 Wh/kg or <8 Wh/L) (2) high costs of manufacture due to organic electrolytes (included to reach high voltages and thus relevant energy densities of about 10 Wh/kg) and high-purity activated carbon electrodes (included to reduce self-discharge at high voltages), and (3) safety concerns associated with using flammable organic electrolytes. These disadvantages limit the wide application of EDLCs.

To increase energy density, previous approaches have included adding redox-active oxides, e.g. $RuO_2$ or $MnO_2$, to electrodes to provide so-called "pseudo-capacitance" that is associated surface Faradaic redox chemistry. These devices exhibit compromised power performance and cycle lifetime, compared to EDLCs. Recently, incorporating solvated redox-active species into electrolytes has been reported to improve charge storage. One advantage of using soluble redox species is that the charge/discharge processes does not involve solid-state reactions or solid-state diffusion. However, an ion-selective membrane separator (such as a Nafion membrane) has been used to separate two different solutions (e.g., a KI solution and a $VOSO_4$ solution) into two compartments of a cell, as a catholyte and an anolyte, respectively. However, the Nafion membrane is expensive and can limit the practical application of an EDLC incorporating the membrane. The use of the ion-selective membrane separator in previous approaches reflects the challenge of controlling the self-discharge reaction between a catholyte and an anolyte.

However, the present disclosure provides an ELDC where the traditional inert electrolyte is replaced with a redox-enhanced electrolyte including an integral active component for storing a charge. As discussed herein, the redox-enhanced electrolyte includes at least two redox couples such that there is a different one of the redox couples for each of the electrodes. That is, the redox-enhanced electrolyte can be oxidized at the positive electrode and reduced at the negative electrode during charging. As discussed herein, the EDLC of the present disclosure can provide an energy density of, for example, about 10 Wh/kg or greater, based on the mass of the electrode and the electrolyte, and about 50

Wh/kg or greater, based on the electrode mass only, without the use of an ion-selective membrane separator.

To better illustrate the energy storage devices and methods disclosed herein, a non-limiting list of examples is provided here:

Example 1 can include subject matter (such as a device) comprising an electrical double layer capacitor (EDLC) including at least two electrodes separated by a redox-enhanced electrolyte having an integral active component for storing a charge, where the redox-enhanced electrolyte includes at least two redox couples, such that there is a different one of the redox couples for each of the electrodes, wherein, when charged, the charge is stored in Faradaic reactions with the at least two redox couples in the electrolyte and in a double-layer capacitance of a porous carbon material that comprises at least one of the electrodes, and where a self-discharge of the energy storage device is mitigated by at least one of electrostatic attraction, adsorption, physisorption, and chemisorption of a redox couple onto the porous carbon material.

In Example 2, the subject matter of Example 1 can optionally include where the at least two redox couples are mixed into the electrolyte and the EDLC does not include an ion-selective separator.

In Example 3, the subject matter of one or both of Examples 1 and 2 can optionally include where the at least two redox couples do not comprise a metal.

In Example 4, the subject matter of one or any combination of Examples 1-3 optionally includes where at least one redox couple comprises a viologen.

In Example 5, the subject matter of one or any combination of Examples 1-4 can optionally include where at least one redox couple comprises Bromine.

In Example 6, the subject matter of one or any combination of Examples 1-5 can optionally include where the electrolyte is an aqueous, organic or ionic liquid.

In Example 7, the subject matter of one or any combination of Examples 1-6 can optionally include where a PH of the redox-enhanced electrolyte, concentrations and ratios of the at least two redox couples, and/or a porosity of the porous carbon material, are adjusted to control an internal self-discharge of the electrical double layer capacitor.

In Example 8, the subject matter of one or any combination of Examples 1-7 can optionally include where each of the at least two redox couples operates at a different potential.

In Example 9, the subject matter of one or any combination of Examples 1-8 can optionally include where the redox couples comprise any couple with a standard reduction potential within an operating voltage window of the electrical double layer capacitor.

Example 10 can include subject matter (such as a method), or can optionally be combined with the subject matter of one or any combination of Examples 1-9 to include such subject matter, comprising a method for fabricating an electrical double layer capacitor (EDLC) including at least two electrodes separated by a redox-enhanced electrolyte that comprises an integral active component for charge storage, where at least one electrode is fabricated from porous conductive carbon material, where the redox-enhanced electrolyte is fabricated to include at least two redox couples, such that there is a different one of the redox couples for each of the electrodes, where the charge is stored in Faradaic reactions with the at least two redox couples in the electrolyte, and where the redox couples comprise compounds having properties selected to inhibit internal self-discharge within the electrical double layer capacitor.

In Example 11, the subject matter of Example 10 can optionally include adjusting a PH of the redox-enhanced electrolyte, concentrations and ratios of the at least two redox couples, and/or a porosity of the porous carbon material, to control an internal self-discharge of the electrical double layer capacitor.

Example 12 the subject matter of one or any combination of Examples 10 or 11 can optionally include where the redox couples comprise compounds selected for their ability to mitigate self discharge of the device via electrostatic attraction adsorption, physisorption and/or chemisorption onto the porous conductive carbon material.

Example 13 the subject matter of one or any combination of Examples 10-12 can optionally include where (a) the device does not comprise an ion-selective separator; (b) the at least two redox couples do not comprise a metal; (c) at least one redox couple comprises a viologen; and/or (d) the electrolyte is an aqueous liquid.

Example 14 the subject matter of one or any combination of Examples 10-13 can optionally include where the device delivers an energy density of at least at least 10 Wh kg$^{-1}$ based on the mass of electrodes and electrolyte.

Example 15 the subject matter of one or any combination of Examples 10-14 can optionally include where the device exhibits a self-discharge rate of less than 50 percent after three hours at open circuit.

Example 16 can include subject matter (such as a method), or can optionally be combined with the subject matter of one or any combination of Examples 1-15 to include such subject matter, comprising a method of inhibiting internal self-discharge of an energy storage device, wherein the device comprises: at least two electrodes, wherein at least one electrode comprises a porous carbon material; and an aqueous redox-enhanced electrolyte comprising a first redox active compound and a second redox active compound, wherein the electrolyte functions as an active component for charge storage, the method comprising: allowing the first redox active compound and/or the second redox active compound to adsorb to the porous carbon material via electrostatic attraction adsorption, physisorption and/or chemisorption, thereby mitigating self-discharge of the device so that internal self-discharge of the energy storage device in inhibited.

In Example 17, the subject matter of Examples 16 can optionally include where the device is an electrical double layer capacitor.

In Example 18, the subject matter of one or any combination of Example 16 or Example 17 can optionally include where the device does not include an ion-selective separator.

In Example 19, the subject matter of one or any combination of Examples 16-18 can optionally where a first redox active couple and a second redox active compound do not include a metal other than potassium or other not redox active counter-ions.

In Example 20, the subject matter of one or any combination of Examples 16-19 can optionally include where at least one redox active compound includes a viologen.

Example 21 can include, or can optionally be combined with any portion or combination or any portions of any one or more of Examples 1-20 to include, subject matter that can include means for performing any one or more of the functions of Examples 1-20.

These non-limiting examples can be combined in any permutation or combination.

These and other examples and features will be set forth in part in the following Detail Description. This Summary is intended to provide a brief overview of subject matter of the present patent application. It is not intended to provide an exclusive or exhaustive explanation of the invention. The detailed description is included to provide further information about the present patent application such as a discussion of the dependent claims and the interrelation of the dependent and independent claims in addition to the statements made in this section.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, the various examples discussed in the present document.

Figure 1A:
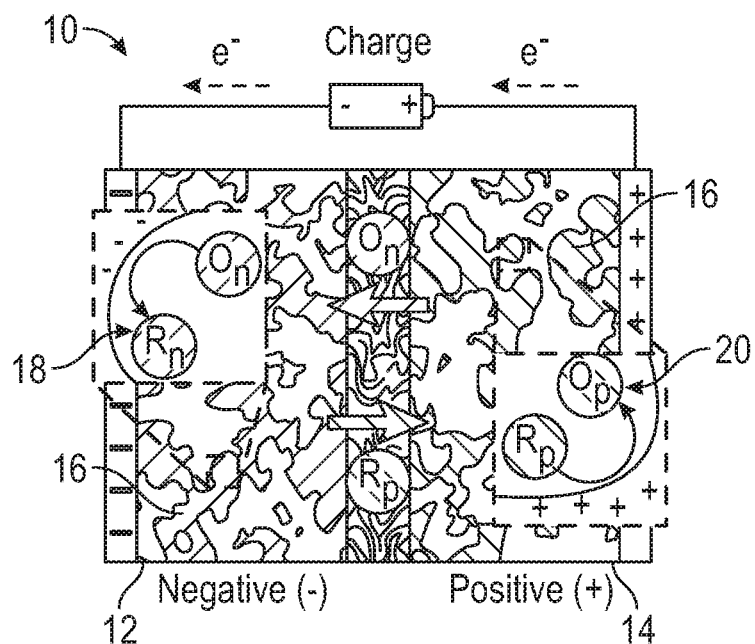
FIG. 1A illustrates an energy storage device during charging, in accordance with at least one example.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In the following detailed description, reference is made to the accompanying drawings which form a part hereof, and specific embodiments in which the disclosure may be practiced are shown by way of illustration. It is to be understood that other embodiments may be used and structural changes may be made without departing from the scope of the present disclosure.

The current disclosure provides an energy storage device including an EDLC having at least two electrodes separated by a redox-enhanced electrolyte that comprises an integral active component for charge storage. For example, the redox-enhanced electrolyte can include two redox couples, such that there is a different one of the redox couples for each of the electrodes (e.g., positive and negative electrodes). By replacing an inert electrolyte with the redox-enhanced electrolyte, additional faradaic charge storage mechanisms can be added to the underlying capacitive ones, as discussed herein. The energy storage device of the present disclosure can increase capacity by utilizing previously "unused" electrolyte mass for energy storage, while maintaining the power and charge-discharge cyclability for appropriate redox-active couples. The energy storage device of the present application also includes aqueous electrolytes and less-expensive carbons, both of which can lower the costs relative to non-aqueous systems.

The EDLC of the present disclosure can provide a redox-enhanced electrolyte including two redox-couples that can significantly improve the energy density of the EDLC. In an example, when charged, a first redox-couple of the electrolyte can be adsorbed on a first electrode and a second redox-couple of the electrolyte can be adsorbed on a second electrode, therefore preventing rapid self-discharge. The EDLC of the present disclosure can retain the key advantages of EDLCs while incorporating Faradaic energy-storage without using ion-selective membrane separators. In an example, the EDLC of the present disclosure can exhibit energy densities from 10 to 15 Wh/kg (based on electrode mass) and stable capacities for greater than 20,000 cycles. Theoretically, this could range from 5-100 Wh/kg.

Figure 1B:
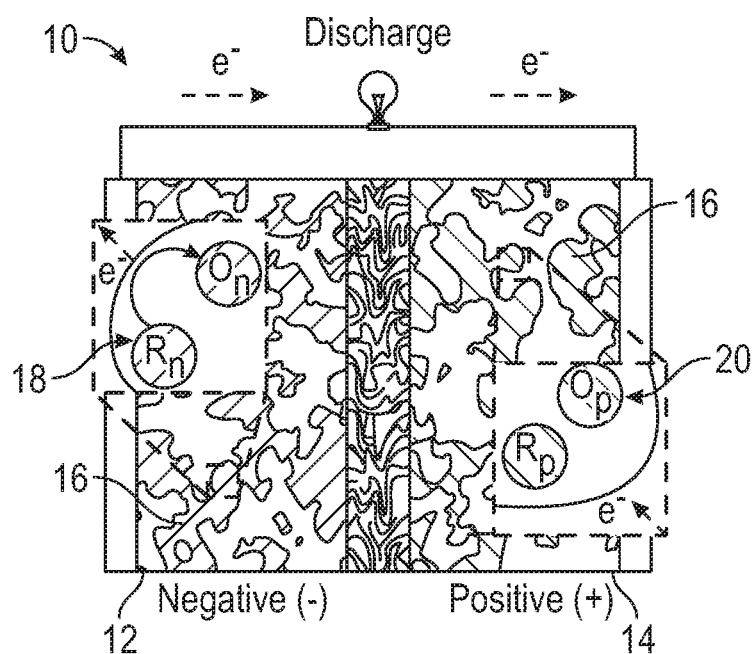
FIG. 1B illustrates an energy storage device during discharging, in accordance with at least one example.

The redox-enhanced electrolyte can be a mixed solution including the two redox couples, which integrate both Faradaic and capacitive energy storage in the same device. The electrodes can become polarized when charged and retard diffusion of the oppositely-charged redox ions to mitigate self-discharge, such that the EDLC does not need an ion-selective membrane as a separator. During charging, the redox-enhanced electrolyte evolves into both a catholyte including a first redox couple and an anolyte including a second redox couple (as shown in FIGS. 1A and 1B). The EDLC involves no solid-state phenomena during operation, no ion-selective membrane separator, and a single electrolyte. The EDLC of the present disclosure is fundamentally different form previous devices, including pseudo-capacitors, batteries and Nafion-containing capacitors.

Prior to applying a charge to the electrodes, the redox-enhanced electrolyte includes a first redox couple and a second redox couple mixed together. However, once a charge is applied to the electrodes, a portion of the charge is transferred to the first redox couple and the second redox couple. As discussed herein, when the charge is transferred to the first and second redox couples, the solubility of the redox couples change, such that they adsorb on their respective charged electrode surface. In other words, when charged, an anolyte including a first redox couple is formed and absorbed on the surface of a negative electrode and a catholyte including a second redox couple is formed and absorbed on the surface of a positive electrode. As used herein, "absorbed" can be defined as the adhesion of ions or molecules to a surface, which creates a film of the adsorbate on the surface of the adsorbent. Above, the word catholyte is synonymous with "oxidized form of the redox couple undergoing redox reactions at the positive electrode" and anolyte is synonymous with "reduced form of the redox couple undergoing redox reactions at the negative electrode". Catholyte and anolyte can also refer to each redox couple, and do not necessarily refer to only one oxidation state of the couple.

FIG. 1A illustrates an energy storage device 10 during charging and FIG. 1B illustrates the energy storage device 10 during discharging, in accordance with at least one example. The energy storage device 10 can include at least two electrodes, for example, a negative electrode 12 and a positive electrode 14 (referred to herein collectively as "electrodes 12, 14").

In an example, the electrodes 12, 14 can include a porous material. For example, the electrodes 12, 14 can include one or more of, but are not limited to, activated carbons, carbide derived carbons, carbon nanotubes, mesoporous carbons, graphenes, reduced graphene oxides, metal oxides, and conducting polymers. In one example, the electrodes 12, 14 can include activated carbon. In an example, the electrodes 12, 14 can have a porosity within a range of about 300 square meter per gram ($m^2/g$) to about 3000 $m^2/g$. For example, the electrodes 12, 14 can have a porosity within a range of about 1500 $m^2/g$ to about 2500 $m^2/g$, such as 1600 $m^2/g$, 1700 $m^2/g$, 1800 $m^2/g$, 1900 $m^2/g$, 2000 $m^2/g$, 2100 $m^2/g$, 2200 $m^2/g$, 2300 $m^2/g$, and 2400 $m^2/g$. Because the redox-enhanced electrolyte contributes substantially to the charge storage capacity of the device and the surface of the carbon participates in the absorption phenomena that prevents self discharge, carbons for redox-EDLCs can include both reasonably large surface areas but also large pore volumes and thus lower overall densities than those typically used for traditional non-redox EDLC devices.

The electrodes 12, 14 can include other components such as binders, conductive additives, and porogens. In an example, the binders can be selected from, but not limited to, polytetrafluoroethylene (PTFE), polyvinylidene difluoride (PVDF), and poly-ionic liquids. In an example, the conductive additives can be selected from, but not limited to, acetylene black, graphene, reduced graphene oxide, and carbon nanotubes.

As shown in FIGS. 1A and 1B, the EDLC 10 can include a redox-enhanced electrolyte 16 including a first redox couple 18 and a second redox couple 20. As discussed herein, the redox-enhanced electrolyte 16 can be a single electrolyte that upon charging can evolve into both an anolyte and a catholyte such that a first redox couple 18 is positioned along a surface of a first electrode 12 and the second redox couple 20 is positioned along a surface of the second electrode 14. The first redox couple 18 is labeled $O_n/R_n$ (e.g., anolyte) and can be used at the negative electrode 12. The first redox couple 18 can be reduced upon charging, and oxidized upon discharge. The second redox couple 20 is labeled $O_p/R_p$ (e.g., catholyte) and can be used at the positive electrode 16. The second redox couple 20 can be oxidized upon charging and reduced upon discharge.

As discussed herein, the redox-enhanced electrolyte 16 can be an aqueous, organic, or ionic liquid and include the first redox couple 18 and the second redox couple 20. The first redox couple 18 for the negative electrode 12 can have standard potentials at or slightly more-cathodic than the hydrogen evolution potential, as well as high solubility and solution compatibility with the catholyte. To minimize or prevent rapid self-discharge, the first redox couple 18 can have a positive charge and physically adsorb on the negative electrode 12 (e.g., activated carbon) following charging.

The second redox couple 20 for the positive electrode 14 can have a reduction potential near, or slightly more positive/anodic than, the oxygen evolution potential to maximize energy density, as well as high solubility and solution compatibility with the anolyte. To minimize or prevent rapid self-discharge, the second redox couple 20 can have a negative charge and physically adsorb on the positive electrode 14 (e.g., activated carbon) following charging.

In an example, the first redox couple 18 can include a viologen and the second redox couple 20 can include a halide (e.g., bromine). In an example, the first and second redox couples 18, 20 do not comprise a metal. The metal-free redox couples are advantageous because they can be less expensive, easier to recycle, do not form dendrites, and are less environmentally harmful. The first redox couple 18 and the second redox couple 20 can be chosen such that the first and second redox couples 18, 20 operate at a different potential.

Viologens are derivatives of 4,4'-bipyridyl. An example of the dicationic 4,4'-bipyridinium portion of a viologen is shown below.

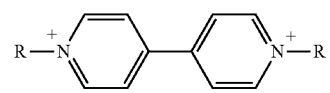

Figure 2:
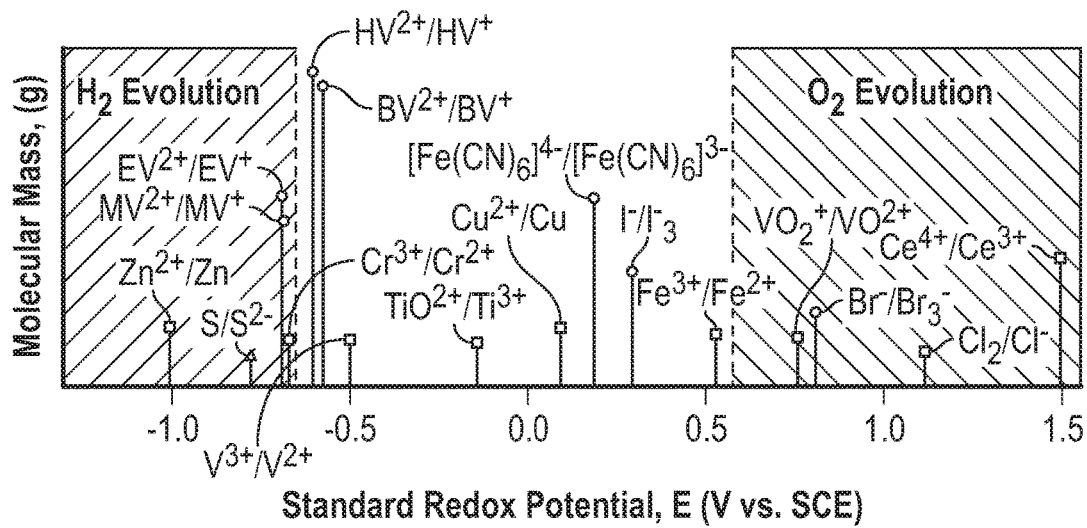
FIG. 2 illustrates reduction potentials for various potential redox couples.

Examples of this viologen are methyl viologen (R=methyl), ethyl viologen (R=ethyl), and benzyl viologen (R=benzyl). These viologens have been isolated as salts of the chloride ($Cl^-$), acetate ($CH_3CO_2^-$) tetraflurorborate ($BF_4^-$), perchlorate ($ClO_4^-$), triflurormethanesulfonate ($CF_3SO_3^-$), tetraphenylborate ($BPh_4^-$), and hexaflurophosphate (PF$_6^-$), to name a few. FIG. 2 illustrates the standard redox potential for methyl, ethyl, heptyl, and benzyl viologen. Each of redox couples for methyl, ethyl, heptyl, and benzyl are stable in neutral conditions. The SCE is the standard calomel electrode.

In an example, the first redox couple 18 can include one of methyl viologen and heptyl viologen. As shown in FIG. 2, the standard potentials for methyl and heptyl viologens are at or slightly more-cathodic than the hydrogen evolution potential. In an example, a concentration of the first redox couple 18 can be within a range from about 0.1 molar (M) to about 5 M, such as 0.1 M.

In one example, the second redox couple 20 can include bromine (Br), which is generally inexpensive and highly soluble (greater than 1 M). Further, as shown in FIG. 2, the aqueous reduction potential of bromine is located above the thermodynamic oxygen evolution potential. In an example, a concentration of the second redox couple 20 can be within a range of about 0.1 M to about 5M, such as about 0.4 M to about 1 M.

The EDLC of the present disclosure can retain the key advantages of EDLCs while incorporating Faradaic energy-storage without using ion-selective membrane separators. In an example, an EDLC including MV and Br can exhibit energy densities of about 14 Wh/kg (based on electrode mass) and an EDLC including HV and Br can exhibit energy densities of about 10 Wh/kg (based on electrode mass) and have stable capacities for greater than 20,000 cycles. Further, the EDLCs of the present disclosure can provide a self-discharge rate of less than 50 percent (%) after 3 hours at open-circuit (i.e. the energy density for a discharge 3 hours after charging is more than 50% of the discharge energy density immediately after charging) for an EDLC including MV and Br as the redox-couples. An EDLC including HV and Br and the redox-couples, the self-discharge rate can be less than 10%-20% (80%-90% retained) over 6 hours.

In an example, the EDLCs of the present disclosure can deliver power densities >1 kW/kg, based on mass of electrodes and electrolyte, which sets them apart from many energy storage technologies. Conventional EDLCs can have a voltage that varies linearly with the state of charge, so the charge-discharge curves are triangular, which can be undesirable for many applications. The ELDCs of the present disclosure exhibit EDLC behavior initially, then transition to battery like behavior at higher voltages, delivering a desirable steady voltage. Together, these properties can provide the high power density of supercapacitors along with the constant potential and high energy density of batteries.

Analysis of Potential Redox-couples for the Positive Electrode

Figure 3A:
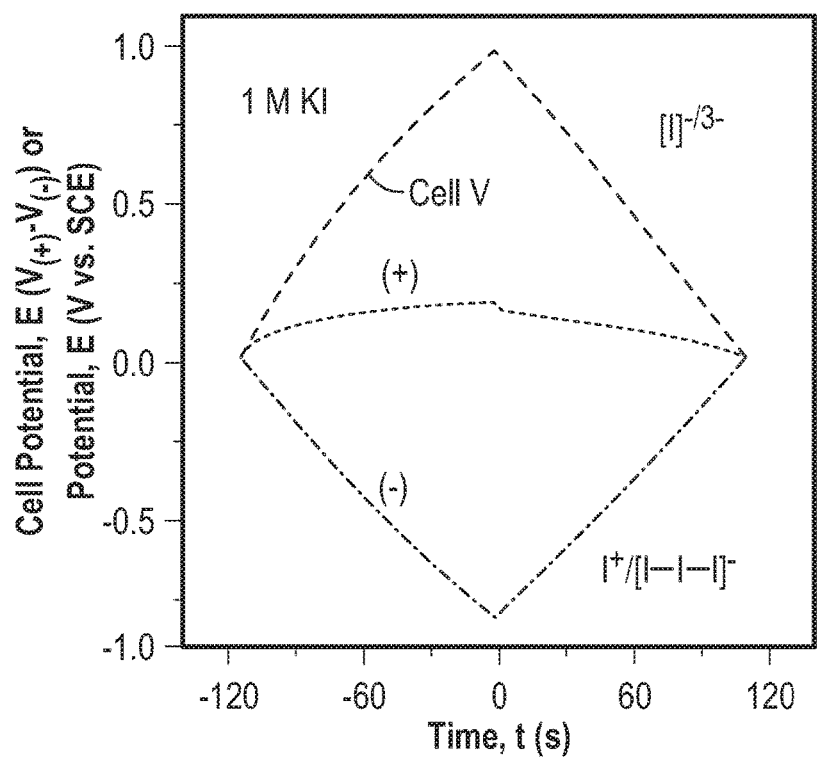
FIG. 3A illustrates the galvanostatic charge/discharge profile of a cell including potassium iodide (KI).
Figure 3B:
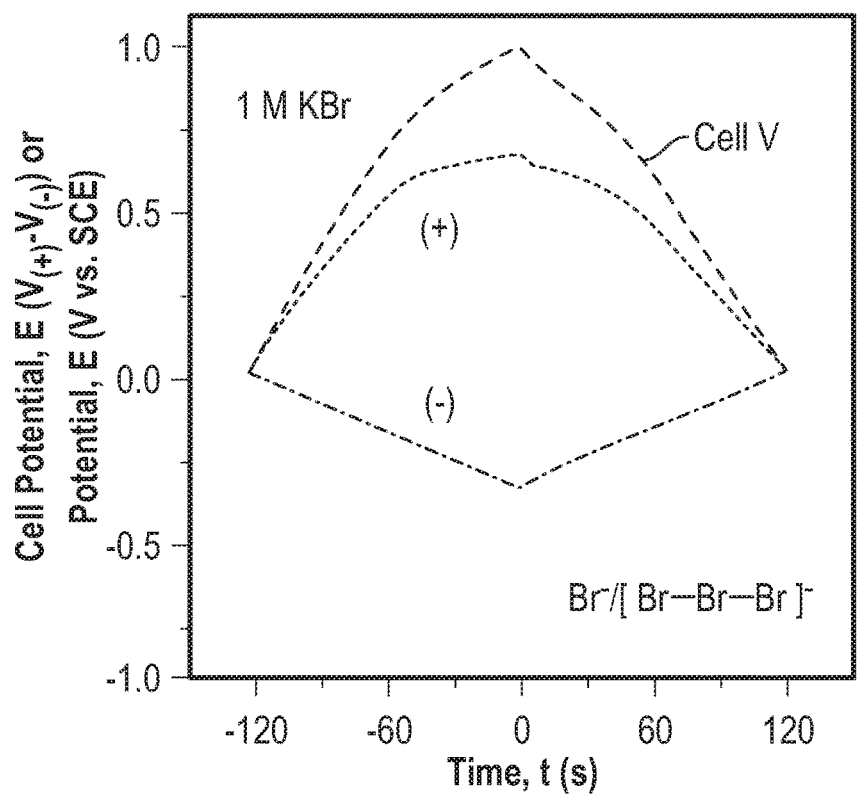
FIG. 3B illustrates the galvanostatic charge/discharge profile of a cell including potassium bromide (KBr).

In order to determine potential redox couples for the positive electrode (e.g., electrode 14), various candidates were tested in a three-electrode Swagelok cell. FIGS. 3A and 3B illustrate the galvanostatic cycling profiles of KI and KBr, respectively. The galvanostatic cycling profiles of the candidate redox-couples were tested in a three-electrode Swagelok cell. The charge/discharge profiles (shown as dashed lines) are shown for the positive electrode (middle line) and the negative electrode (bottom line). The cells were charged/discharged at a rate of 1 A g$^{-1}$$_{(+) \, electrode}$ (normalized to the mass of the positive electrode only, because the negative electrode mass was varied to accommodate couples with different redox potentials) to a total cell voltage of 1 V. The middle and bottom lines show the potential of the positive and negative electrodes, respectively, referenced to the centrally placed SCE. For 1 M KI, the positive electrode potential narrowly varied between 0.02 V and 0.19 V vs. SCE, suggesting oxidation of I$^-$ to I$_3^-$. The negative electrode potential varied linearly with charge between 0.02 V and −0.91 V vs. SCE indicating a double-layer charging mechanism with inert K$^+$.

For 1 M KBr, the positive electrode shows two distinct charging regimes.

For the first 60 seconds (s), the electrode potential depends linearly on the charge added, indicating capacitive charging with Br$^-$ in the double layer. For the next 60 s the potential increases to about 0.7 V vs. SCE, suggesting oxidation of Br$^-$ to B$_r$3$^-$ (or Br$^2$). The negative electrode showed purely capacitive charging. The high redox potential of Br$^-$/Br$_3^-$ is advantageous for increasing energy density.

Figure 5A:
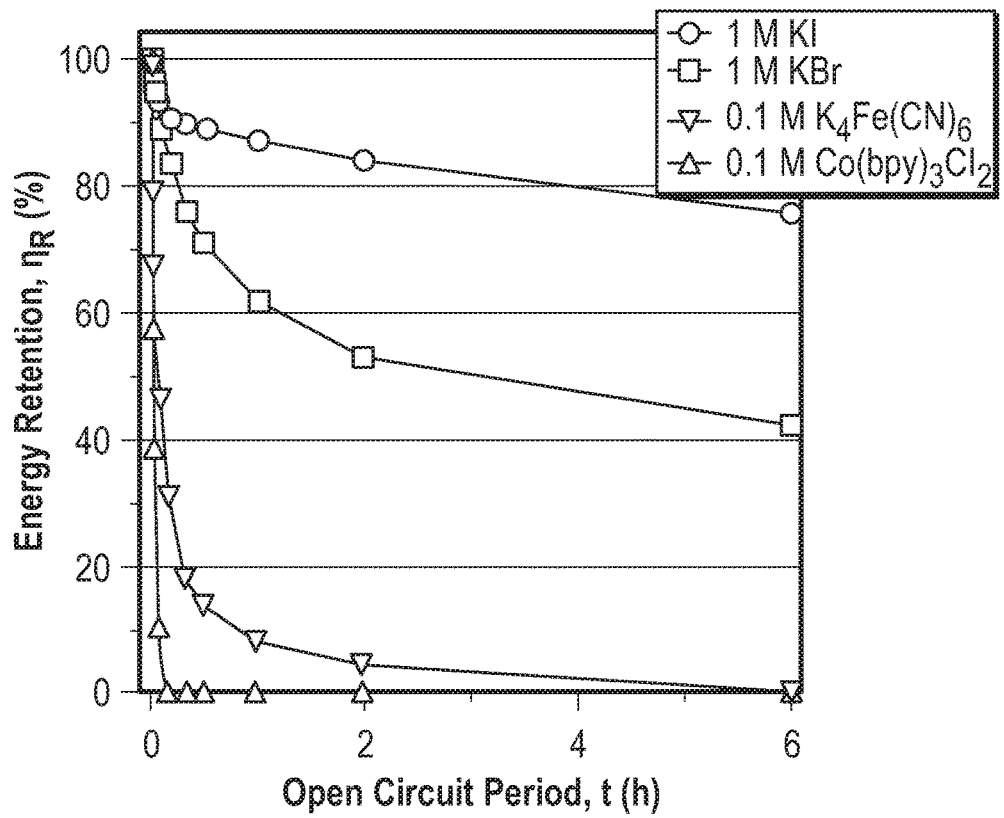
FIG. 5A illustrates the energy retention for the cells including KI, KBr, $Co(bpy)_3^{2+/3+}$, and ($K_4Fe(CN)_6$).

EDLC self-discharge is commonly studied by monitoring the potential decay at open circuit. However, because the charge is not a linear function of potential for redox-EDLCs, the remaining energy in the cell was measured by complete discharge at each time point. The results are shown in FIG. 5A, which illustrates the energy retention for KI, KBr, Co(bpy)$_3^{2+/3+}$, and (K$_4$Fe(CN)$_6$).

The self-discharge profiles of KI and KBr show energy retention of 76% and 43% after 6 hours, respectively. Remarkably, the self-discharge rate of the KI cell is closer than that of the control K$_2$SO$_4$ cell when also charged to 1 V (energy retention=67% after 6 hours; shown in FIG. 5B). Given the lack of an ion-selective membrane, the slow self-discharge of the cells is unexpected. After charging the KI cell, a large concentration gradient of I$^{3-}$ and I$^-$ between the positive and negative electrode is present that would normally be expected to drive diffusive transport across the cell resulting in fast self-discharge.

Not to be bound by theory, but one hypothesis to explain the remarkably slow self-discharge is that the negatively charged oxidation products I$_3^-$ or Br$_3^-$ are electrostatically held in the double layer of the positively charged activated carbon electrode. To test this, cells were fabricated with potassium ferrocyanide K$_4$Fe(CN)$_6$ and cobalt trisbipyridine dichloride Co(bpy)$_3$Cl$_2$ redox-active electrolytes. Both couples have reduction potentials similar to and undergo fast one-electron oxidations suitable for testing at the positive electrode. Co(bpy)$_3^{2+/3+}$ has a positive charge, and thus would be expected to be expelled from the double layer at the positive electrode (where it is oxidized) and subsequently reduced after diffusing to the negative electrode, thus increasing the self-discharge rate. Fe(CN)$_6^{4-/3-}$ has a negative charge, like I$_3^-$/I$^-$, and thus might also show retarded self-discharge if electrostatic effects play the dominate role.

Figure 3C:
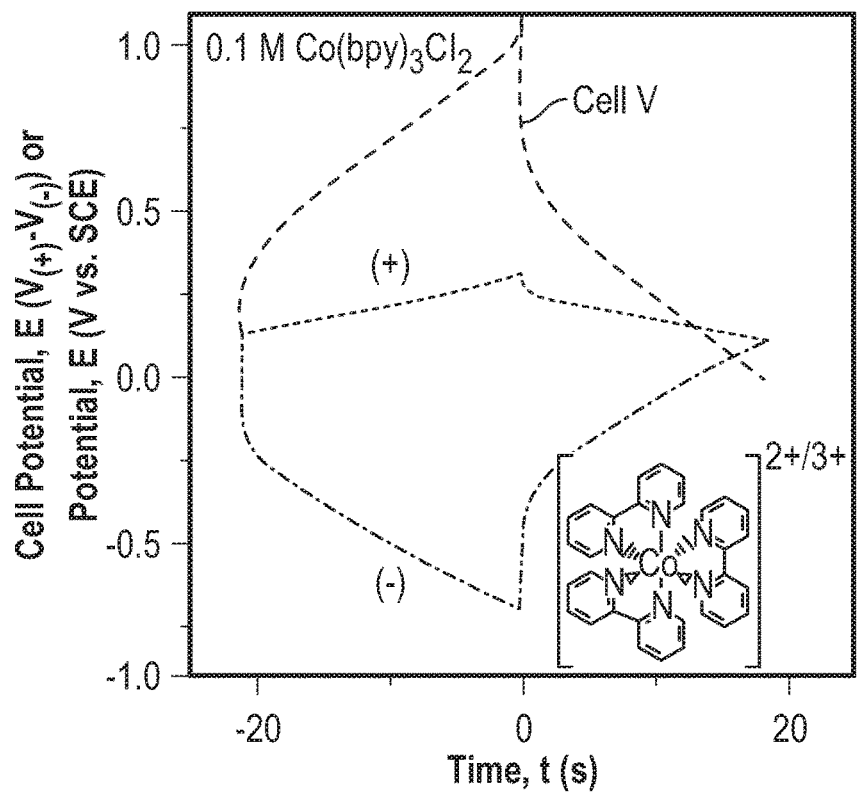
FIG. 3C illustrates the galvanostatic charge/discharge profile of a cell including cobalt trisbipyridine dicholoride ($Co(bpy)_3^{2+/3+}$).
Figure 3D:
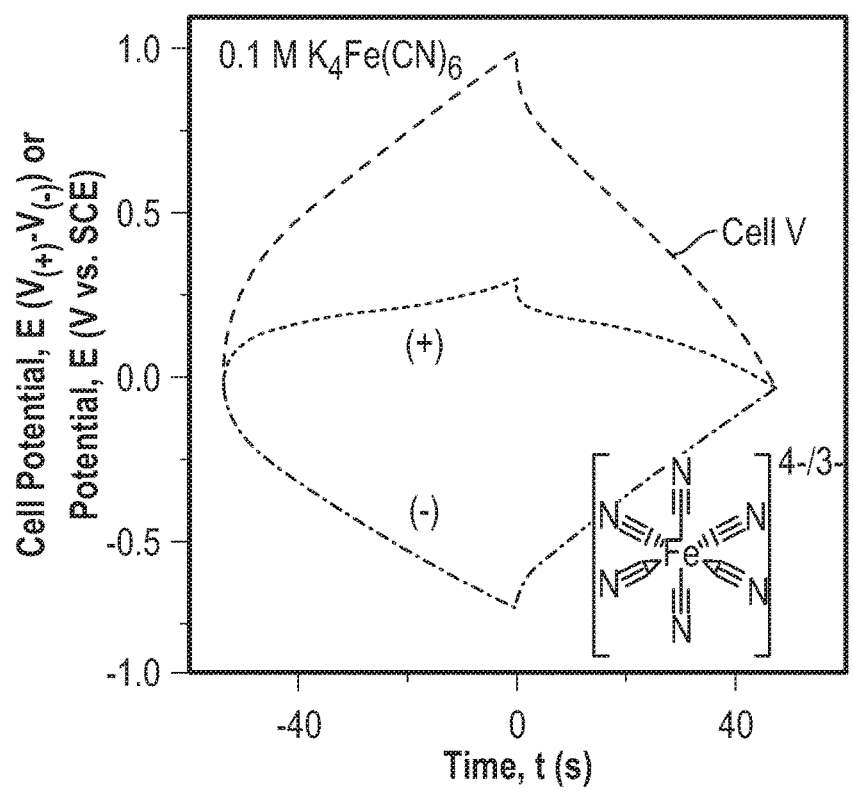
FIG. 3D illustrates the galvanostatic charge/discharge profile of a cell including potassium ferrocyanide ($K_4Fe(CN)_6$).

FIGS. 3C and 3D illustrate the galvanostatic charge/discharge profiles for cells including Co(bpy)$_3$Cl$_2$ and K$_4$Fe(CN)$_6$, respectively. The galvanostatic charging behavior at the positive electrode (middle line) for K$_4$Fe(CN)$_6$ and Co(bpy)$_3$Cl$_2$ is similar to the KI cell with the electrode potential pinned near the standard potential of the couple (FIG. 3A). The negative electrodes (bottom line) show capacitive (linear potential-time) response on charging, while upon discharging an additional potential loss is measured that is associated with the low ionic conductivity of the 0.1 M redox-active electrolytes.

The Co(bpy)$_3$Cl$_2$ and K$_4$Fe(CN)$_6$ cells have 89.5% and 90.8% coulombic efficiency, respectively, which is substantially lower than the 99.9% and 98.8% measured for the KI and KBr cells, respectively (see Table 1).

As shown in FIG. 5A, the Co(bpy)$_3$Cl$_2$ cell loses half of its energy in 1 min, while the K$_4$Fe(CN)$_6$ cell takes 5 min to lose half of its energy. This data is consistent with electrostatics contributing to the self-discharge in the case of Co(bpy)$_3^{2+/3+}$ and retarding it in the case of Fe(CN)$_6^{4-/3-}$ and for the halides. However, despite the large negative charge of Fe(CN)$_6^{4-/3-}$ its self-discharge rate is still roughly 100 times faster than that of I$_3^-$/I$^-$. The retarded self-discharge for the halides cannot be explained purely by electrostatics.

A likely mechanism to explain the slow self-discharge of the halides is physical adsorption of the oxidized species within the activated carbon surface leading to slow cross diffusion. The total charge passed associated with I$^-$ oxidation during galvanostatic charging is 0.620 C. Assuming a footprint of ~2.5×10$^{-19}$ m$^{-2}$ I$_3^-$, complete adsorption would only cover 3.6% of the activated carbon surface in the positive electrode. This small level of required coverage is consistent with physical adsorption being the primary mechanism preventing self-discharge and electrostatic effects being secondary. For both the KBr and KI cells the observed potential plateau at the positive electrode (FIGS. 3A and 3B) is ~0.1 V less positive than the standard potential of the respective couples. This is consistent with specific adsorption stabilizing the oxidized halide, thus shifting the formal potential of the couple positive of the standard potential within the activated carbon.

Analysis of Potential Redox-couples for the Negative Electrode

As discussed herein, redox couples for the negative electrode O$_n$/R$_n$ can have standard potentials at or slightly more-cathodic than the hydrogen evolution potential, as well as high solubility and solution compatibility with the catholyte. To prevent rapid self-discharge, O$_n$/R$_n$ can have a positive charge and physically adsorb on the activated carbon following charging.

Viologen dications (4,4'-dipyridinium compounds) are positively charged, highly soluble redox couples, with formal potentials negative of the hydrogen potential and fast, reversible, kinetics. Methyl viologen dichloride (MVCl$_2$) was studied due to its negative reduction potential (E°=−0.69 V vs. SCE) and commercial availability, and low cost (e.g., <$5 kg$^{-1}$ in bulk, used as a common agricultural chemical). Being a nearly co-planar π-π conjugated ring system, MVCl$_2$ can adsorb on activated carbon surfaces. Stronger adsorption is likely after reduction of MV$^{2+}$ to MV$^+$ due to decreased charge density and increased co-planarity of the two adjacent rings.

Figure 4A:
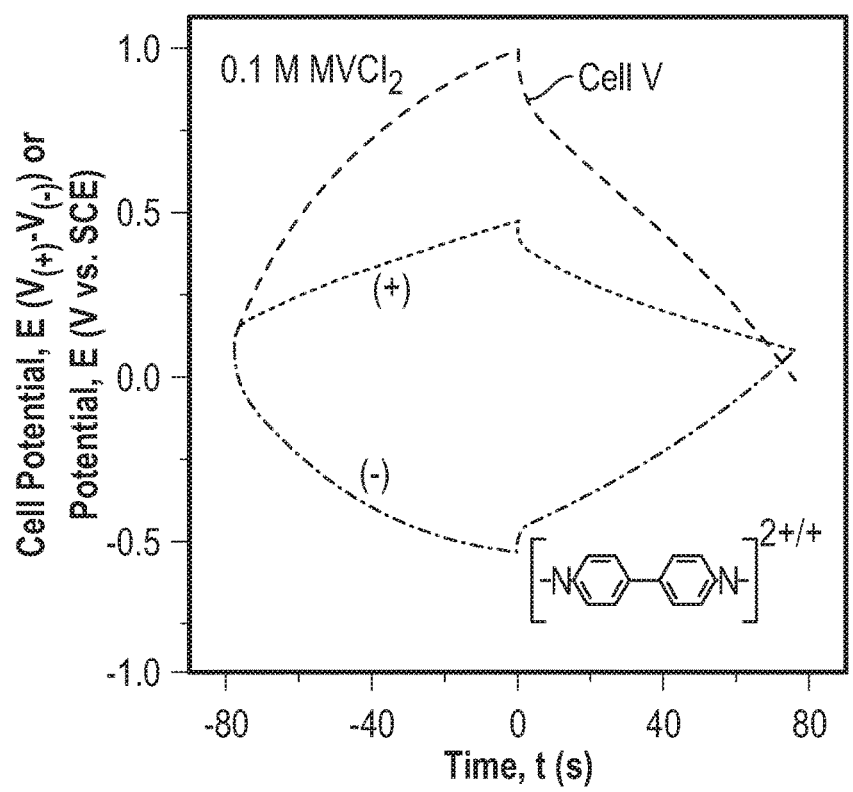
FIG. 4A illustrates the galvanostatic charge/discharge profile of a cell including methyl viologen dichiloride ($MVCl_2$).
Figure 5B:
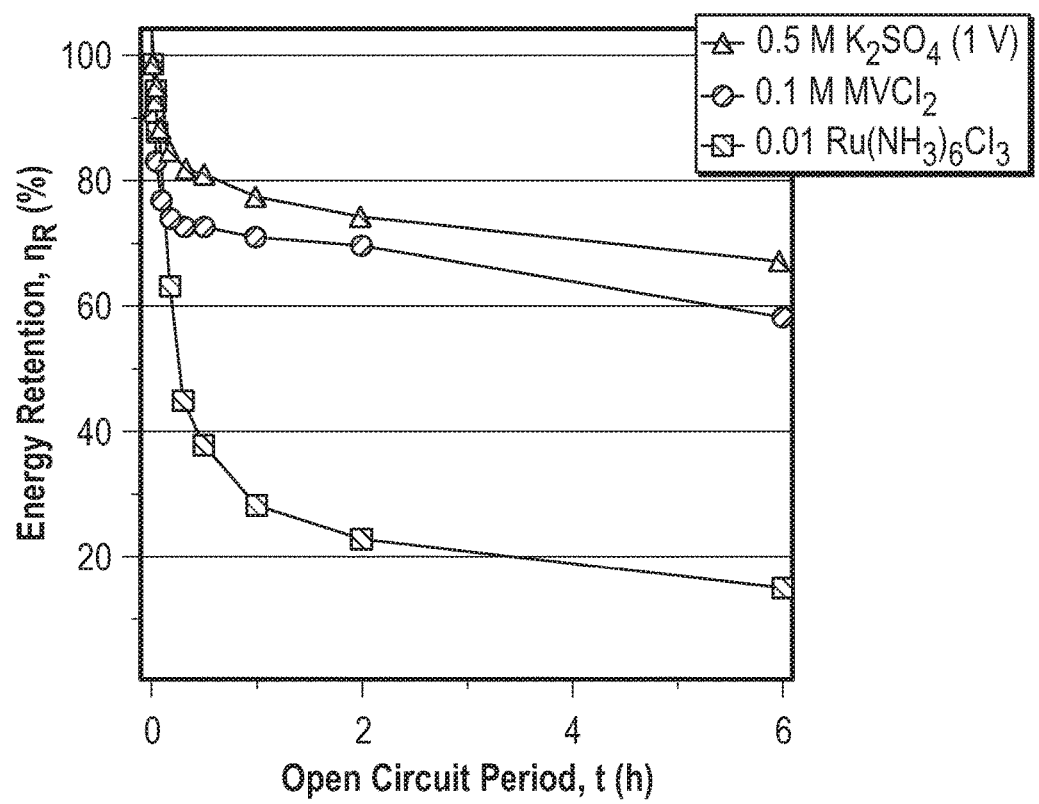
FIG. 5B illustrates the energy retention for the cells including potassium sulfate ($K_2SO_4$), $MVCl_2$, and $Ru(NH_3)_6^{2+}$.

In order to study the viologen electrochemistry in the absence of a redox-active electrolyte at the positive electrode, a 4:1 mass ratio for the positive:negative electrode was used (the counter ion is inert over the accessible potential range). FIG. 4A illustrates the galvanostatic charge/discharge profile for a cell including MVCL$_2$. During galvanostatic charging, the positive electrode (middle line) potential varied nearly linearly with time while the negative electrode (bottom line) potential curves substantially with time near about −0.5 V vs. SCE. The self-discharge rate of the MVCl$_2$ electrolyte was measured (as shown in FIG. 5B) and was found comparable to that of the EDLC with 0.5 M K$_2$SO$_4$, suggesting that the redox couple does not contribute substantially to self-discharge via redox shuttling.

Figure 4B:
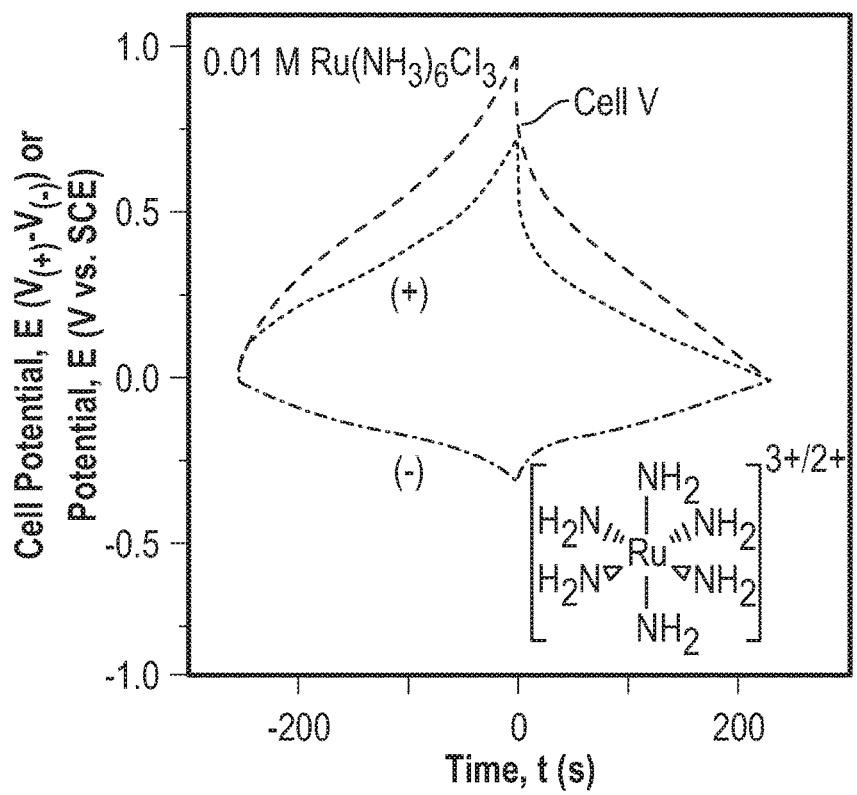
FIG. 4B illustrates the galvanostatic charge/discharge profile of a cell including ruthenium hexamine dicholoride ($Ru(NH_3)_6^{2+}$).

To understand the self-discharge processes in the MV$^{2+}$ electrolytes, a ruthenium hexamine dichloride electrolyte was studied (shown in FIG. 4B). Ru(NH$_3$)$_6^{3+}$/Ru(NH$_3$)$_6^{2+}$ is cationic, like MV$^{2+}$/MV$^+$, but is unlikely to specifically absorb on the activated carbon surface because of its near-spherical molecular shape. The Ru(NH$_3$)$_6$Cl$_3$ cell shows double-layer charging with Cl$^-$ on the positive electrode and some faradaic charging on the negative electrode with a slight plateau near −0.2 V consistent with the reduction of ruthenium hexamine (E°~−0.14 V vs. SCE). The self-discharge rate, however, is significantly faster for Ru(NH$_3$)$_6$Cl$_3$ than for MVCl$_2$, providing further evidence that electrostatic effects are not sufficient to prevent self-discharge and that MV$^+$ adsorbs on the carbon electrode as do the halide ions.

Redox-Enhanced Electrolyte Systems

The EDLC of the present disclosure includes the redox-enhanced electrolyte for the positive and negative electrodes. All species in both redox states (O$_n$, R$_n$, O$_p$, R$_p$) can stable in the same electrolyte to reduce manufacturing complexity. Based on the results from studying the individual couples, halogen/viologen electrolytes were studied.

Figure 6:
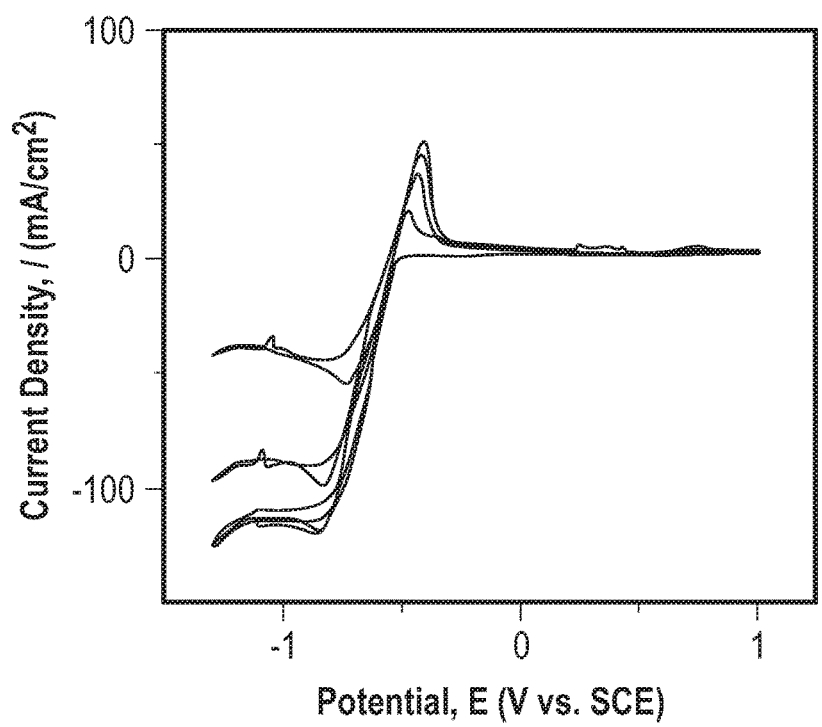
FIG. 6 illustrates the cyclic voltammogram of a cell including KI and $MVCl_2$.

MVCl$_2$/KI is stable in the uncharged state but forms MV$^+$-I$^-$ precipitate upon charging leading to irreversible capacity loss (as shown in FIG. 6). For example, FIG. 6 illustrates the cyclic voltammogram of the mixed 0.3 M KI/0.3 MVCl$_2$ solution collected at 5 mV s$^{-1}$. A three-electrode half-cell configuration was used, with GC disc working electrode, coiled Pt counter electrode and SCE reference electrode. In cathodic scans, the reduction peak of MV$^{2+}$ was observed near −0.7 V in the CV. Simultaneously, a black spike-shaped solid grew on the GC surface identified as irreversible MV$^{19+}$-I$^{31}$ formation. Moreover, the redox reaction of I$^-$/I$_3^-$ was not observed.

Figure 7:
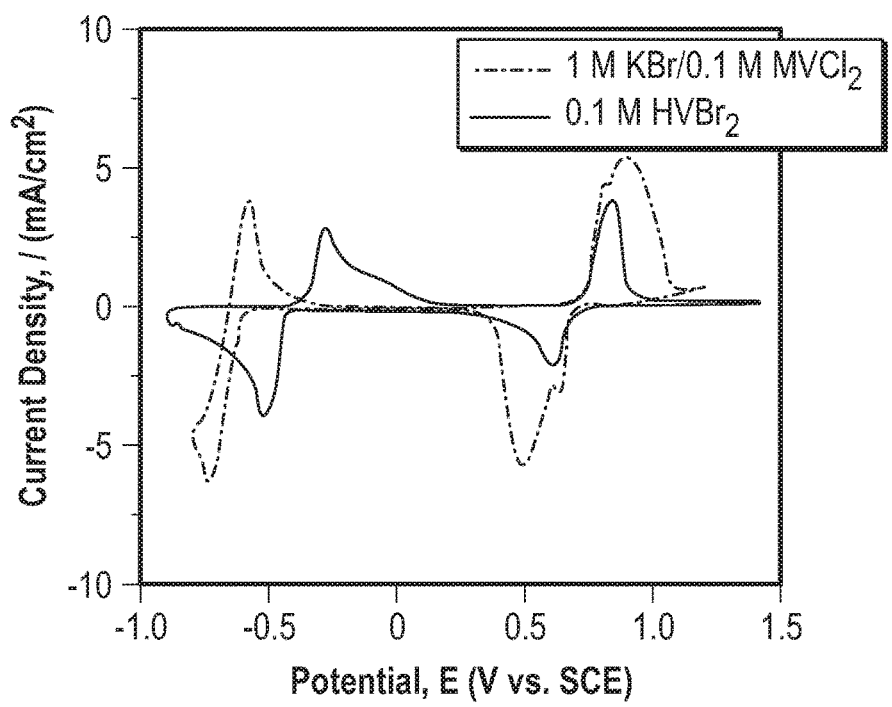
FIG. 7 illustrates the cyclic voltammogram of a cell including $KBr/MVCl_2$ and $HVBr_2$.

In contrast, MVCl$_2$/KBr solutions showed highly reversible redox behavior of both redox-ions in analytical voltammetry cells (as shown in FIG. 7). FIG. 7 illustrates the cyclic voltammogram of the mixed solution of 1 M KBr/0.1 M MVCl$_2$ and 0.1 M HVBr$_2$ collected at 5 mV s$^{-1}$. Both solutions show the redox process between Br$^-$/Br$_3^-$ near 0.72 V vs. SCE. Other redox processes from MV$^{2+}$/MV$^+$ at −0.64 V and HV$^{2+}$/HV$^+$ at −0.40 V vs. SCE are observed in 1 M KBr/0.1 MVCl$_2$ and 0.1 HVBr$_2$ solution, respectively. Both solutions show reversible redox behavior for both redox couples, without irreversible interaction between them. Br$^-$ benefits from a more positive oxidation potential compared to I$^-$, thus providing increased specific energy.

Figure 8:
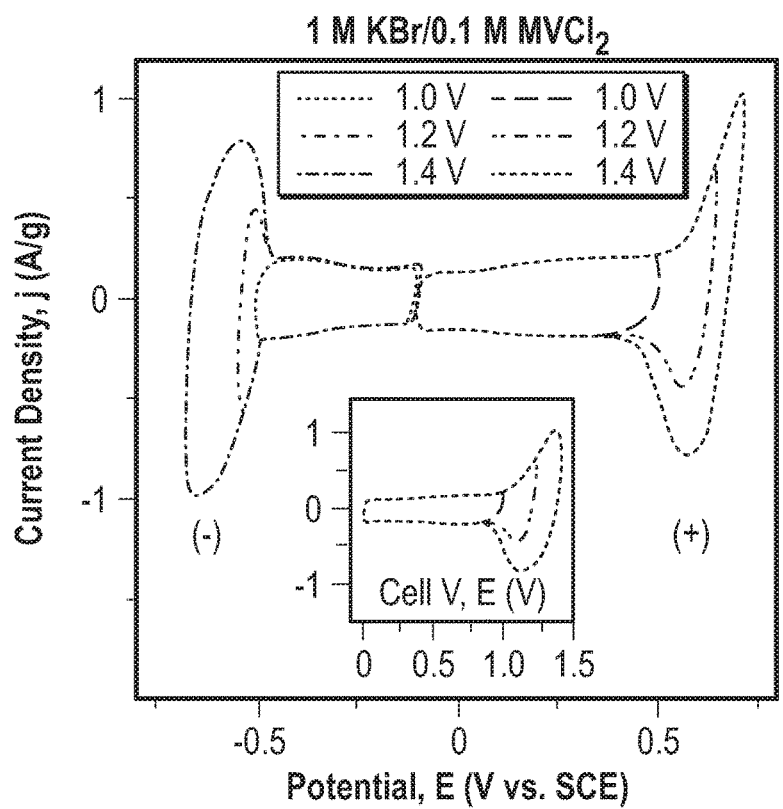
FIG. 8 illustrates the voltammograms for the complete cell including $KBr/MVCl_2$.
Figure 9:
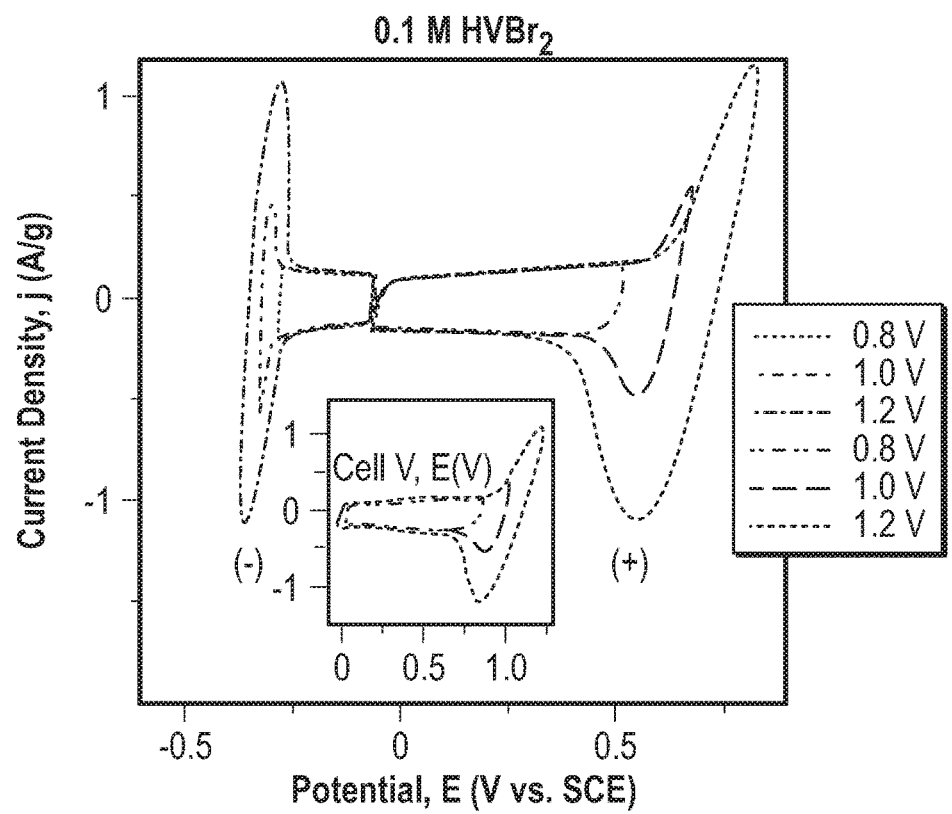
FIG. 9 illustrates the voltammograms for the complete cell including $HVBr_2$.
Figure 10:
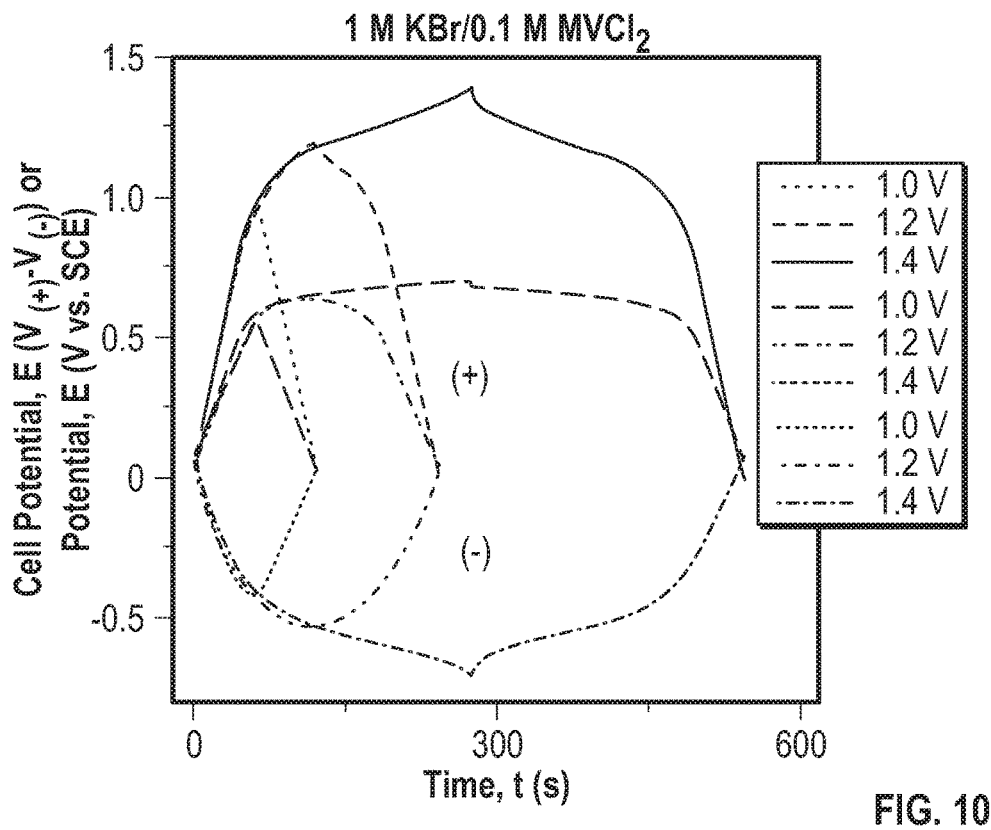
FIG. 10 illustrates the galvano static charge/discharge profile for a cell including $KBr/MVCl_2$.
Figure 11:
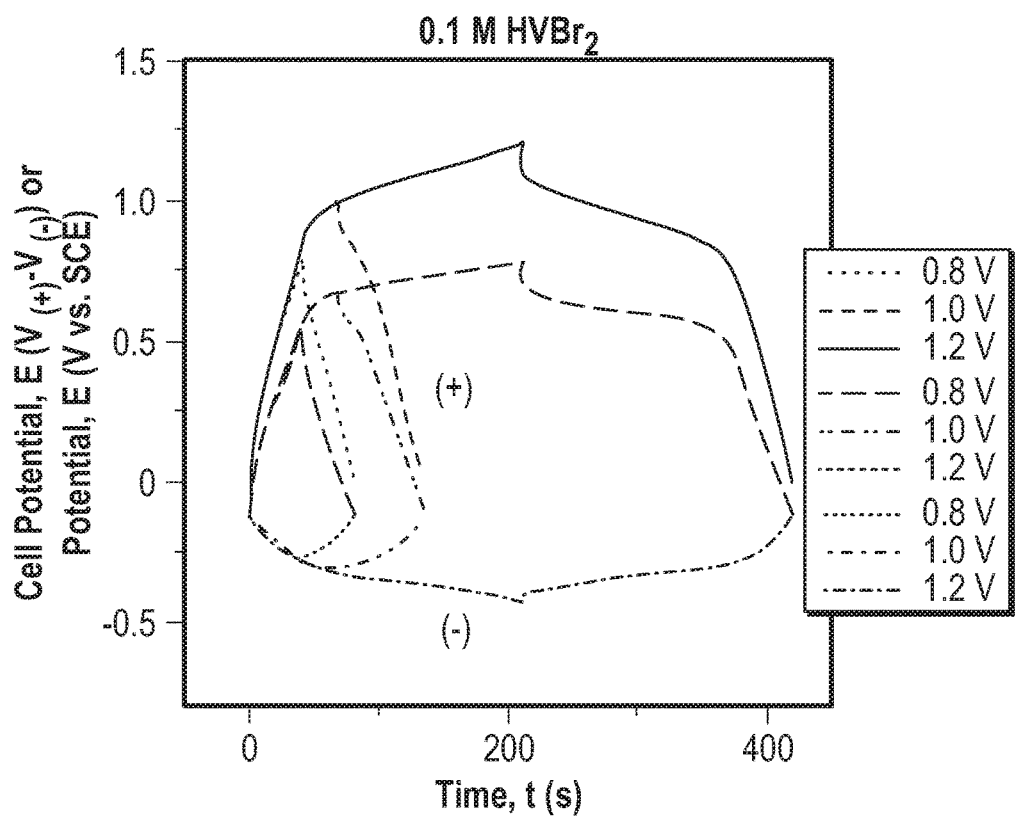
FIG. 11 illustrates the galvanostatic charge/discharge profile for a cell including $HVBr_2$.
Figure 12:
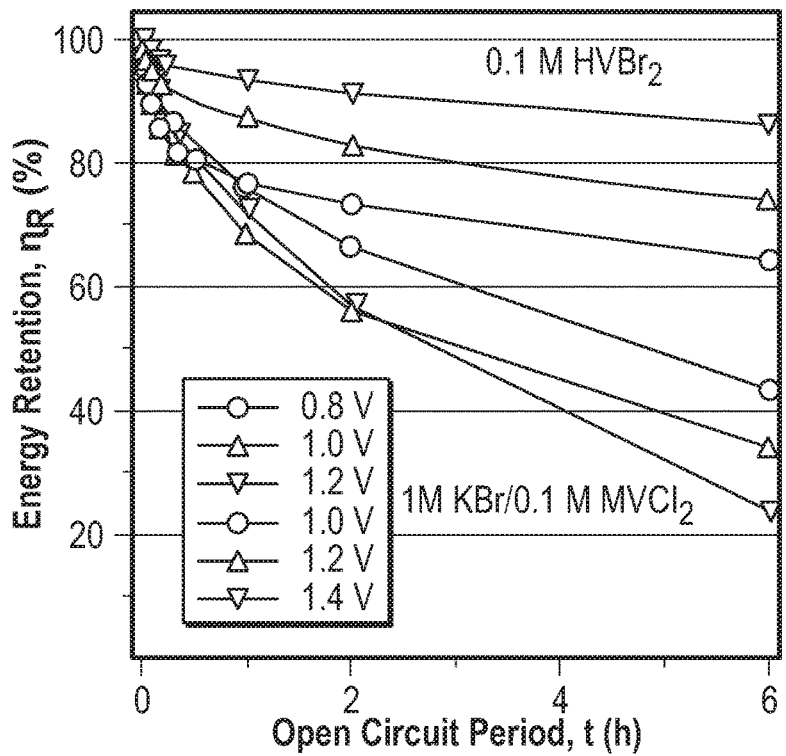
FIG. 12 illustrates the energy retention for a cell including $KBr/MVCl_2$ and $HVBr_2$.
Figure 13:
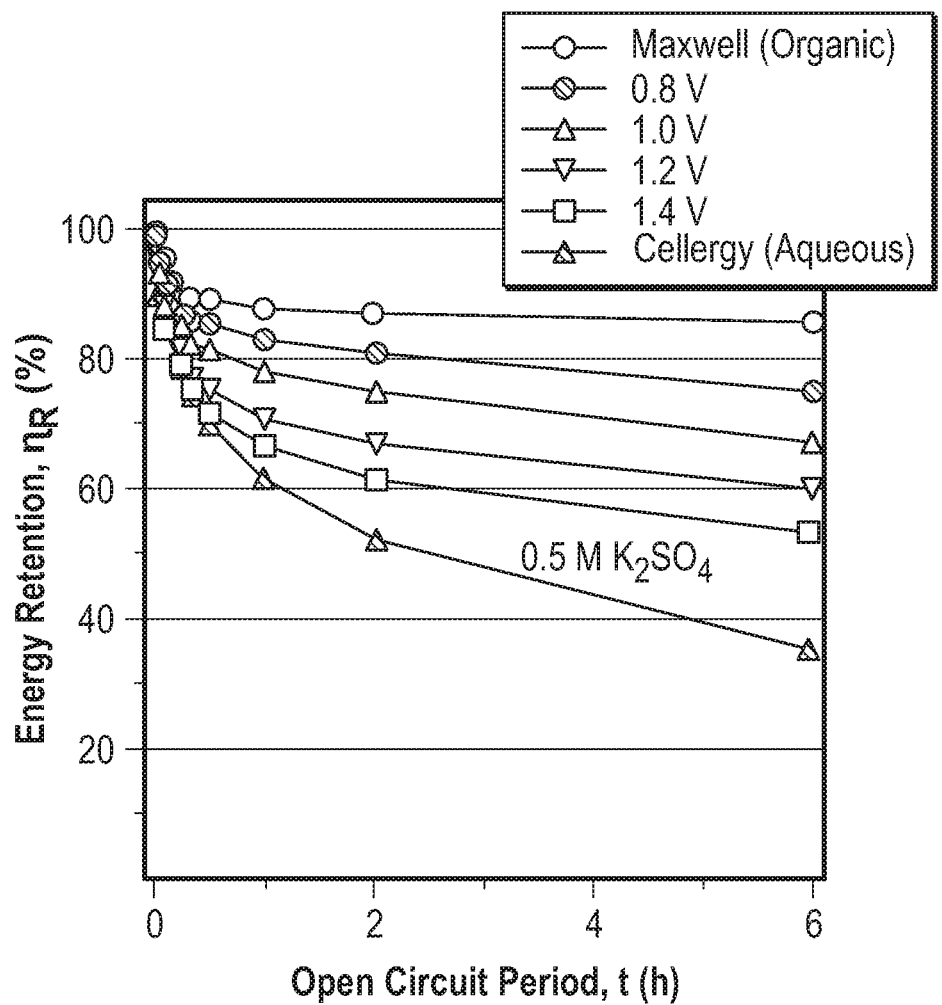
FIG. 13 illustrates the energy retention for the control cells tested with an inert electrolyte.

Cells with a 1 M KBr/0.1 M MVCl$_2$ electrolyte and a 0.1 M HVBr$_2$ were tested by voltammetry and galvanostatic cycling to probe the charging mechanism. FIGS. 8 and 9 illustrate the votammograms for the KBr/0.1 M MVCl$_2$ cell and the 0.1 M HVBr$_2$ cell, respectively, collected at 5 mV s$^{-1}$ (inset) with the voltages for the positive (middle line) and negative (bottom line) electrode separately recorded. FIGS. 10 and 11 illustrate the galvanostatic charge/discharge profiles at 0.5 A g$_{dry}^{-1}$ to a total cell potential between 0.8 and 1.4 V for the 1 M KBr/0.1 M MVCl$_2$ cell and a 0.1 M HVBr$_2$ cell, respectively. FIG. 12 illustrates the energy retention for 1 M KBr/0.1 M MVCl$_2$ cell and the 0.1 M HVBr$_2$ cell. FIG. 13 illustrates the energy retention for the control cells tested with inert electrolyte.

For 1 M KBr/0.1 M MVCl$_2$, the total cell potential was swept between 0 and 1.4 V, while the current and potential of each electrode was simultaneously measured relative to the reference in the Swagelock cell (FIG. 10). Voltammograms collected with a 1 V sweep are rectangular indicating a purely capacitive charging mechanism at both electrodes (FIG. 8). As the Br/MV cell was cycled beyond 1 V, current peaks were observed at the positive and negative electrodes corresponding to Br$^-$ oxidation to Br$_3^-$ and MV$^{2+}$ reduction to MV$^+$, respectively, (FIG. 8).

As shown in FIG. 10, at both the positive and negative electrodes (middle and bottom line, respectively) an initial capacitive (linear) voltage-time response is observed followed by faradaic response as the electrode potential approaches the reduction potential of the couple.

FIGS. 12 and 13 illustrate that the self-discharge rate for the 1 M KBr/0.1 M MVCl$_2$ cell charged to 1.4 V ($t_{1/2 \cdot E_{max}}$=170 min) is similar to the commercial Cellergy control capacitor ($t_{1/2 \cdot E_{max}}$=140 min), but is still faster than the commercial non-aq. Maxwell cell and the KI or KBr aq. cells ($t_{1/2 \cdot E_{max}}$>6 h), suggesting the MV$^{2+}$/MV$^+$ is a contributor to the self-discharge reaction under these conditions.

To further improve the self-discharge (and cycle stability as discussed herein) we explored different commercially available viologens. Heptyl viologen (HV) can form a strongly bonded solid on electrodes following its reduction in aqueous solution in the presence of Br$^-$ or I$^-$. The present inventors have found that this adsorption/insolubility can be useful to impede internal shunting as long as the adsorption process is highly reversible. First, HVBr$_2$ (the chloride salt is not commercially available) was tested in cells in an identical fashion as described above for the KBr/MVCl$_2$ cells. The results are similar with the exception that HV$^{2+}$ has a more-positive reduction potential (E°=−0.60 V vs. SCE) than MV$^{2+}$ leading to a lower plateau voltage. The galvano static charge-discharge curves (FIG. 11) also show evidence of higher ionic resistance due to the lower ion concentration used in this particular cell.

The self-discharge rate of the HVBr$_2$ electrolyte (FIG. 12), however, is substantially lower than for KBr/MVCl$_2$. Further, the self-discharge rate goes down for HVBr$_2$ as the charging voltage is increased, whereas the rate goes up for MVCl$_2$/KBr with voltage. This data is consistent with the strong adsorption/precipitation of the HV$^+$ onto the activated carbon following charging. The weaker-adsorbing MV$^+$ can contribute substantially to self-discharge when large concentrations build up at high states of charge.

The formation of the HV$^+$ films was confirmed by voltammetry and visual observation on a GC electrode in an analytical half-cell (FIG. 7). In addition, the thin HVBr$_2$ layer formed on the electrode might partially block the Fe$^{2+/3+}$ impurity transport. We also note that the adsorption/precipitation process was completely reversible with the HVBr$_2$ showing >99.9% coulombic efficiency.

The specific capacity and energy density of the redox-enhanced cells were evaluated based on galvanostatic cycling profiles at multiple potentials. The results are shown in Table 1.

TABLE 1

Performance metrics obtained from data shown in FIGS. 8-13 collected using Swagelock cells.

| performance | 1M KBr/0.1M MVCl$_2$ | | | 0.1M HVBr$_2$ | | |
|---|---|---|---|---|---|---|
| metric | 1.0 V | 1.2 V | 1.4 V | 0.8 V | 1.0 V | 1.2 V |
| specific capacity*, Q$_{dis}$ (mAh/g$_{dry}$) | 9.2 | 18.0 | 37.9 | 4.0 | 9.0 | 32.1 |
| specific energy*, E$_{dis}$ (Wh/kg$_{dry}$) | 5.2 | 14.5 | 38.7 | 1.3 | 4.8 | 26.4 |
| coulombic efficiency, η$_C$(0) | 89.6% | 99.0% | 98.8% | 99.9% | 99.4% | 99.9% |
| energy efficiency, η$_E$(0) | 99% | 92% | 92% | 63% | 80% | 87% |
| energy retention, η$_R$(6 h) | 43% | 33% | 24% | 64% | 64% | 86% |

*normalized to carbon electrode mass only

The data in Table 1 was collected in the Swagelock cell with excess electrolyte and therefore the performance metrics were normalized to the mass of the electrodes only and do not include the electrolyte. These results are further analyzed via an electrochemical model below. The dramatic effect of the added faradaic reaction is apparent; the 1 M KBr/0.1 M MVCl$_2$ cell at 1.4 V (driving faradaic+capacitive charging) stores over four times more charge than at 1.0 V (capacitive charging only), and has eight times larger energy density.

To increase energy density as well as minimize ionic resistances, higher redox-active electrolyte concentrations were examined. In addition, the practical specific energy and power are evaluated based on both electrode and electrolyte mass, as they are both integral to the charge storage process. MVCl$_2$ is highly soluble in water (>2 M), where-as the HVBr$_2$ solubility is limited to <0.2 M.

A 1.0 M KBr/0.5 MVCl$_2$ cell and a 0.4 M KBr/0.1 HVBr$_2$ cell were tested in a two-electrode "volume-limiting" cell, which accommodates a precise quantity of electrolyte. Thin polycarbonate film (9 μm) instead of Whatman paper (180 μm) was used as a separator to minimize excess electrolyte mass. The use of a thinner separator also shortens the diffusion pathway for redox ions and thus faster self-discharge is expected than with Whatman paper. The KBr/HVBr$_2$ cell with a polycarbonate separator exhibits $t_{1/2 \cdot E_{max}}$=370 min, significantly faster self discharge than with Whatman paper ($t_{1/2 \cdot E_{max}}$=2600 min, FIG. S11). Nonetheless, the self-discharge rate in the Br/HV cells is still slower than control EDLCs using the same polycarbonate film ($t_{1/2 \cdot E_{max}}$=230 min). Further, the self-discharge rate decreased after prolonged cycling for HVBr$_2$. After 1000 galvanostatic charge/discharge cycles, η$_R$(6 h)=87% and $t_{1/2 \cdot E_{max}}$=1770 min. After 2000 cycles it increased to η$_R$(6 h)=93% and $t_{1/2 \cdot E_{max}}$=3800 min. This excellent self-discharge rate is an important figure of merit as a practical energy storage device.

Performance parameters measured from the galvanostatic cycling at 0.5 A g$_{dry}^{-1}$ in volume-limiting cells are given in Table 2.

TABLE 2

Performance metrics for electrolyte-volume-limited cells.

| Redox-active species | 1M KBr/ 0.5M MVCl$_2$ | 0.4M KBr/ 0.1M HVBr$_2$ |
|---|---|---|
| Electrode masses (mg) (including binder and conductive additive) | Cathode: 20.7 mg Anode: 20.6 mg | Cathode: 10.0 mg Anode: 10.0 mg |

TABLE 2-continued

Performance metrics for electrolyte-volume-limited cells.

| Redox-active species | 1M KBr/ 0.5M MVCl$_2$ | 0.4M KBr/ 0.1M HVBr$_2$ |
|---|---|---|
| Electrolyte mass (mg) | 110.1 mg | 53.1 mg |
| Operating voltage (V) | 1.4 V | 1.2 V |
| specific capacity*, $Q_{dis}$ | 13.3 mAh/g$_{wet}$ (48.8 mAh/g$_{dry}$) | 12.1 mAh/g$_{wet}$ (44.0 mAh/g$_{dry}$) |
| specific energy*, $E_{dis}$ | 13.9 Wh/kg$_{wet}$ (51.0 Wh/kg$_{dry}$) | 10.8 Wh/kg$_{wet}$ (39.3 Wh/kg$_{dry}$) |
| Power density*, $P_{dis}$ | 142 W/kg$_{wet}$ (521 W/kg$_{dry}$) | 122 W/kg$_{wet}$ (447 W/kg$_{dry}$) |

*The performance data were normalized by both electrodes and electrolyte mass and, in parenthesis, by electrode mass only.

The mass-based metrics are reported normalized to both the total active-material mass (electrodes+electrolytes) and, in parentheses, the electrode mass only (as is more-typically reported). The specific energy achieved for the KBr/MVCl$_2$ system (~14 Wh kg$_{wet}^{-1}$ or 50 Wh kg$_{dry}^{-1}$ when only electrode mass is counted) and KBr/HVBr$_2$ system (~11 Wh kg$_{wet}^{-1}$ or 39 Wh kg$_{dry}^{-1}$) is substantially larger than all previous reports of aqueous redox-EDLCs.

Figure 14:
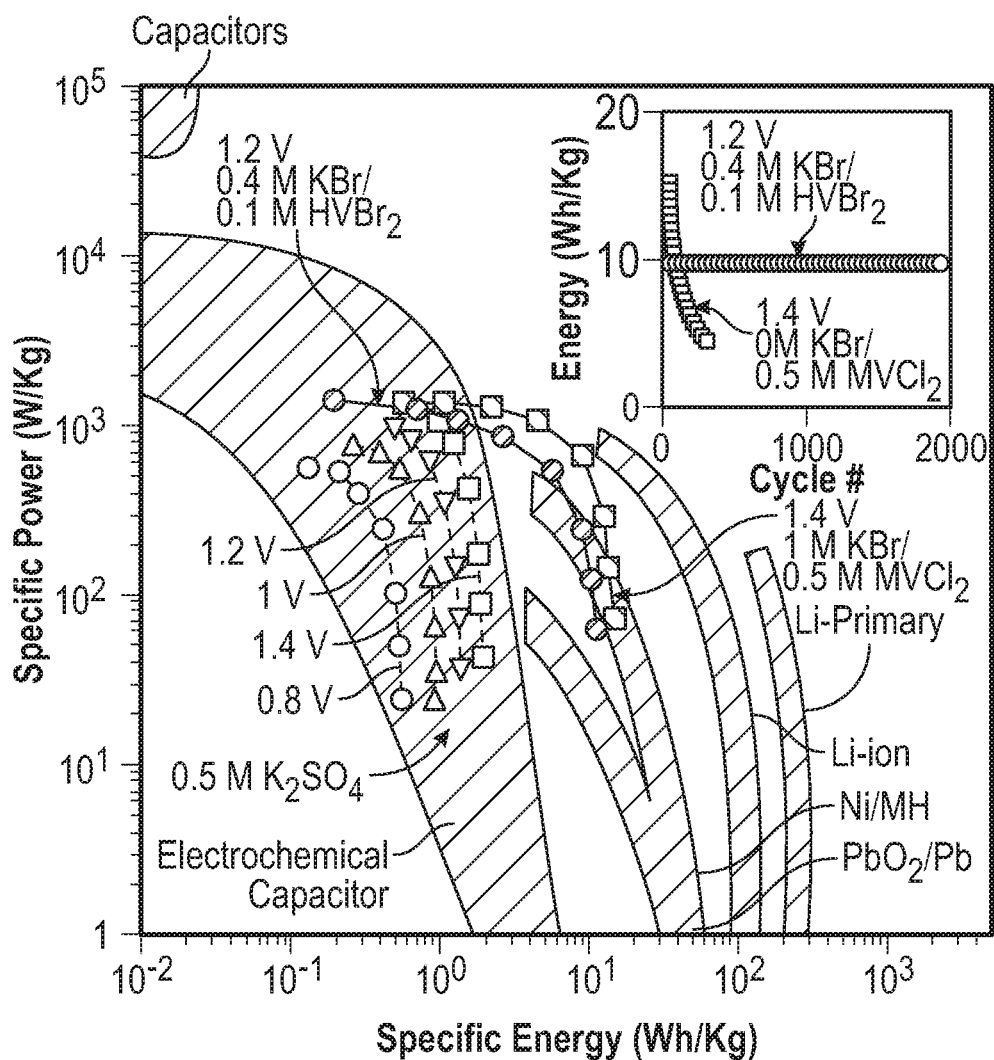
FIG. 14 illustrates a Ragone plot of redox-EDLC performance from volume-limiting cells. The inset illustrates the cycling stability for a cell including $KBr/MVCl_2$ and $KBr/HVBr_2$.

The relationship between energy and power in the redox-EDLC devices are compared the performance to control aqueous K$_2$SO$_4$ devices and published reference data on a Ragone plot (FIG. 14). The metrics estimated for both devices are promising as they fill a gap between high-power batteries and traditional EDLCs using simple, potentially low-cost, aq. chemistry.

To study degradation/fading, several cells were cycled at 0.5 A g$_{dry}^{-1}$ (FIG. 14 inset). The energy density of the KBr/MVCl$_2$ cell fades over the course of several hundred cycles. This degradation is likely due to irreversible polymerization of MV$^+$ in the aqueous electrolyte. In comparison, the KBr/HVBr$_2$ cell shows no fading over 2,000 cycles and its specific energy and power are largely limited by the low solubility of HV$^{2+}$. There are hundreds of viologen derivatives that can be easily synthesized and it is likely that appropriate combination of solubility and stability can be found. As a practical energy device, the Br/HV cell has a slow self-discharge, long-term stability, and relatively high specific energy.

As discussed herein, previous approaches aimed to enhance conventional EDLCs by harnessing faradaic charging from soluble redox species by relying on a single redox process at one electrode coupled with capacitive charging at the other. However, this mismatch in capacity of the two electrodes lowers the cell-level performance. The Br/viologen cell disclosed in this disclosure is designed and optimized to achieve high energy density considering all active components, the electrode and electrolyte, using two complementary redox species to provide simultaneous faradaic charging at both electrodes.

Electrochemical Model and Predicted Performance Limits

To better understand the system and predict performance limits an electrochemical model is provided where the contributions from capacitive and faradaic processes are treated separately but occurring simultaneously. At every state of charge, the amount of capacitive and faradic charge passed to (or from) one electrode is a function of the electrode potential $E_{el}$. The capacitive contribution to the charge $q_{cap}$ is equation (1):

$$q_{cap} = C_{sp} \cdot m_{el} \cdot |E_{el} - E_{el,0}| \quad \text{(Equation 1)}$$

where $C_{sp}$ is the specific electrode capacitance, $m_{el}$ is the electrode mass, and $E_{el,0}$ is the electrode potential in the discharged state. The faradaic contribution is derived from the Nernst equation (i.e. assuming fast electrode kinetics), shown as equation (2):

$$q_{cap} = C_{sp} \cdot m_{el} \cdot |E_{el} - E_{el,0}| \quad \text{(Equation 2)}$$

$E_{el}$ is the electrode potential, R is the gas constant, T is the temperature in Kelvin, n is the number of electrons involved in the electrochemical half-reaction, and $E^{0'}$ is the formal potential for the redox half-reaction. Q is the reaction quotient for the general redox half-reaction, $\chi X + ne^- \rightarrow \gamma Y$, and is a function of the total charge transferred through redox reactions $q_{red}$, the initial redox-species concentration, and the electrolyte volume. Combining equations yields $q_{red}$ as a function of $E_{el}$.

The total faradaic charge passed through the electrode $q_{far}$ at a potential $E_{el}$ is equation (3):

$$q_{far} = q_{red}[E_{el}] - q_{red}[E_{el,0}] \quad \text{(Equation 3)}$$

The total charge passed for an electrode is the sum of faradaic $q_{far}$ and capacitive $q_{cap}$ components, shown as equation (4).

$$q_{el} = q_{far} + q_{cap} \quad \text{(Equation 4)}$$

The complete cell operates under the constraints that the total charge passed $q_{cell}$ is equal to the charged passed at the positive $q_p$ and negative $q_n$ electrodes, shown as Equation 5.

$$q_{cell} = q_p = q_n, \quad V_{cell} = E_p - E_n \quad \text{(Equation 5)}$$

Figure 15:
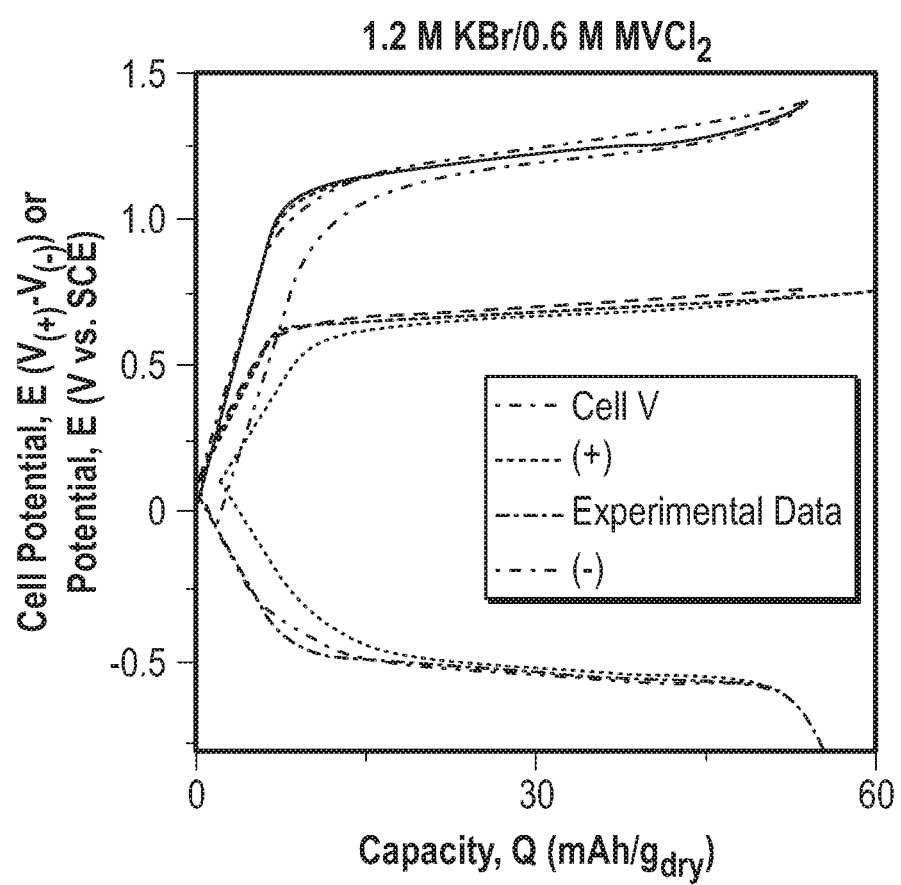
FIG. 15 illustrates cell potential for model calculations compared to experimental data for galvano static charge/discharge profiles.

The above set of equations is solved numerically to generate charge-discharge profiles for the redox-capacitors, as are overlaid on experimental data in FIG. 15.

The experimental data (dashed lines) was for a 1 M KBr/0.5 M MVCl$_2$ (nominal) cell cycled to 1.4 V at 0.5 A g$_{dry}^{-1}$. The experimental charge and discharge curves are overlaid to illustrate the hysteresis and coulombic efficiency of the real cell. The model parameters that best fit the experimental data are $C_{sp,+}$=95 F g$^{-1}$, $C_{sp,-}$=105 F g$^{-1}$, $E^{el}_{Br_3^-/Br^-}$=0.70 V vs. SCE, $E^{el}_{MV^{2+}/MV^+}$=-0.53 V vs. SCE, [KBr]=1.2 M, and [MVCl$_2$]=0.6 M. All other values, such as electrode mass and dimensions, electrolyte density, free volume available to electrolyte, and $E_{el,0}$ were measured experimentally or calculated directly from experimental measurements.

Comparing the model to experimental data provides insight into the device operation. The formal potential of MV$^{2+}$/MV$^+$ (in the activated carbon) is found to be -0.53 V vs. SCE, less negative than the standard potential of -0.69 V vs. SCE. For Br$^-$/Br$_3^-$, the model provides formal potential of 0.70 V vs. SCE, less positive than the standard potential of 0.81 V vs. SCE. The formal potentials obtained from the model thus indicate strong adsorption at both electrodes, consistent with the slow self-discharge.

Because the electrolyte volume and total faradaic charge passed through the cell are known, it is also possible from the model to calculate the initial concentration of redox-active species. Electrodes soaked in 1 M KBr/0.5 M MVCl$_2$ before cell assembly end up with an effective MV$^{2+}$ concentration close to 0.6 M and electrodes soaked in 1 M KBr/0.1 M MVCl$_2$ with a MV$^{2+}$ concentration close to 0.4 M. Submerging the electrodes in excess electrolyte during fabrication can lead to concentration of the viologen in the activated carbon due to physical adsorption.

The agreement between experiment and simulation indicate the EDLC including the redox-enhanced electrolyte operates as outlined in the above electrochemical model. The simulation thus provides a platform to predict the performance limits of the technology. By adjusting variables including electrode density, which determines the free volume available for redox-enhanced electrolyte, and the concentration of redox-active species, we calculated the performance of different cell configurations (FIG. 16).

Figure 16:
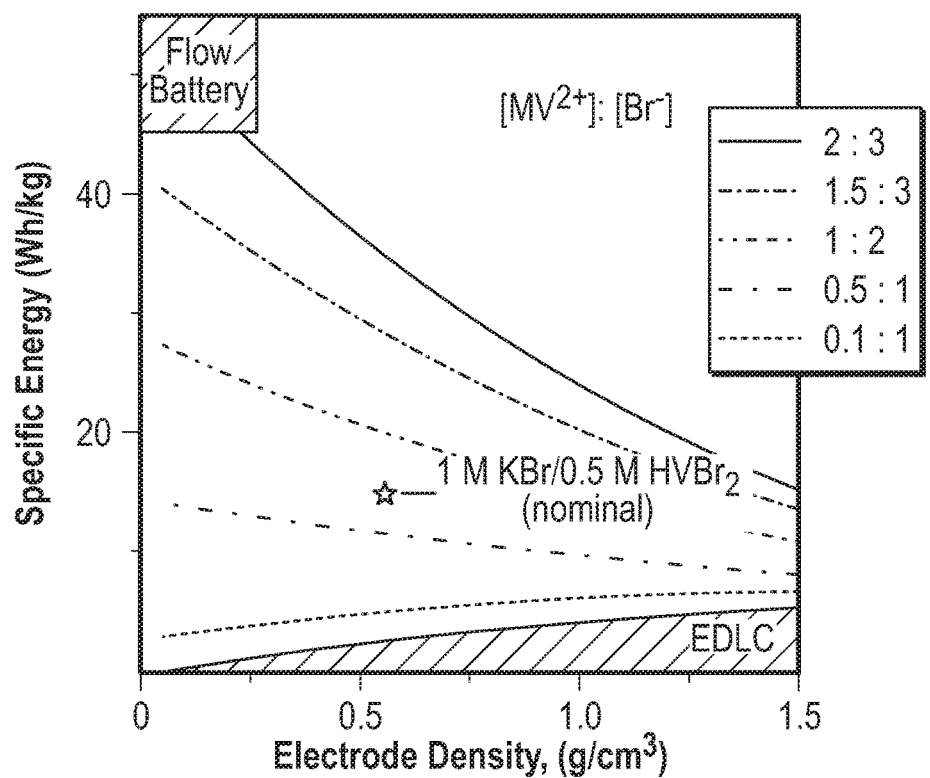
FIG. 16 illustrates the theoretical specific energy using the electrochemical model for the cell including $KBr/MVCl_2$.

As shown in FIG. 16, the numbers indicate different concentrations (in mol/L) of redox-couples in the electrolyte for a range of activated carbon electrode densities. The specific energy is normalized to the mass of electrodes and electrolyte and the specific capacitance of each electrode is modeled as 100 F/g. For very low electrode density, the performance is determined only by the redox-enhanced electrolyte (somewhat akin to a flow battery). Without redox-couples the pure EDLC behavior is recovered, as indicated by the EDLC region at the bottom of the plot. The experimental data for the 0.5 M MVCl$_2$/1 M KBr (nominal) cell with a density of 0.42 g/cm$^3$ and capacitance of 108 F/g is indicated by the star.

The simulations suggest that by finding a new viologen with the stability of heptyl viologen and the high solubility of methyl viologen, a specific energy 2-3 times higher than what is reported here is experimentally possible.

In summary, the present disclosure provides a metal-ion-free (ignoring the K$^+$ counter ions), redox-enhanced electryte using Br/viologen as the two redox-couples, which has a specific energy of 14 Wh kg$_{wet}^{-1}$ (1 M KBr/0.5 MVCl$_2$) and 10 Wh kg$_{wet}^{-1}$ (0.4 M KBr/0.1 HVBr$_2$) when accounting for the complete electrolyte and electrode mass, without the use of an ion-selective membrane separator. Because redox-couples (e.g., redox-active ions) compose the electrolyte, the approach effectively converts the "dead" weight of a conventional EDLC electrolyte into an active element for charge storage. The EDLCs of the present disclosure can use a neutral-pH electrolyte, can be assembled without a dry-room or glove box, and have slow self-discharge.

The present disclosure also provides a three-electrode cell design and methods to follow both faradaic and non-farardaic processes at each electrode simultaneously, and a two-electrode cell design where the electrolyte volume/mass is controlled and the electrolyte is confined solely between positive and negative electrodes. We found that, in addition to the obvious redox-active-electrolyte properties expected to impact performance (e.g. couple solubility, formal potential, charge transfer kinetics, and cost), redox ion specific adsorption dramatically affects the self-discharge rate. Upon charging (positive electrode: R$_p$→O$_p$+ne$^-$, negative electrode O$_n$+n'e$^-$→R$_n$) concentration gradients develop in all soluble species across the two electrodes.

As discussed herein, previous approaches have reported redox-EDLCs incorporating an ion-selective membranes (e.g Nafion) to prevent these gradients from driving parasitic self-discharge via diffusion. However, the present inventors have found that if the O$_p$ is negatively charged it slows self-discharge, which may be due to better confinement within the positively charged activated carbon electrode. Specific adsorption or reversible precipitation of the redox ions in the activated carbon, however, more-substantially retarded self-discharge and enabled design of an aqueous HVBr$_2$ cell with outstanding self-discharge performance similar to commercial non-aqueous cells.

The electrochemical model discussed herein, was developed and used to quantitatively describe the measurements and demonstrate that, with targeted design of new couples, the energy density could be further improved by a factor of three to near 50 Wh kg$^{-1}$.

This new approach to redox-EDLCs thus enables the use of aqueous. electrolytes and inexpensive metal-free redox-couple e electrolytes with low self-discharge rates and energy and power performance in-between that of batteries and traditional capacitors.

Methods for Forming Carbon Electrodes

Nanoporous carbon was prepared by CO$_2$ activation from high-purity carbon powder (Donacarbo, Osaka Gas Co.). A carbon precursor (1 g) positioned in the center of a tube furnace was heated to 890° C. under flowing CO$_2$ (100 mL min$^{-1}$) for 22.5 h, which resulted in burn-off of 73.2% of the carbon mass and resulted in a BET surface area of 2470 m$^2$ g$^{-1}$. The elemental composition (inductively coupled plasma analysis) and pore size distribution of the prepared activated carbon were characterized (as shown in Table 3 and FIG. 17).

TABLE 3

Inductively coupled plasma (ICP) elemental analysis result on CO$_2$ activated Donacarbo.

| CO$_2$ activated Donacarbo | | | | |
|---|---|---|---|---|
| Al | S | Ca | Fe | Zn |
| 0.001 wt. % | 0.001 wt. % | 0.004 wt. % | 0.009 wt. % | 0.001 wt. % |

*Only elements with over 1/1000 wt. % were shown.

Figure 17:
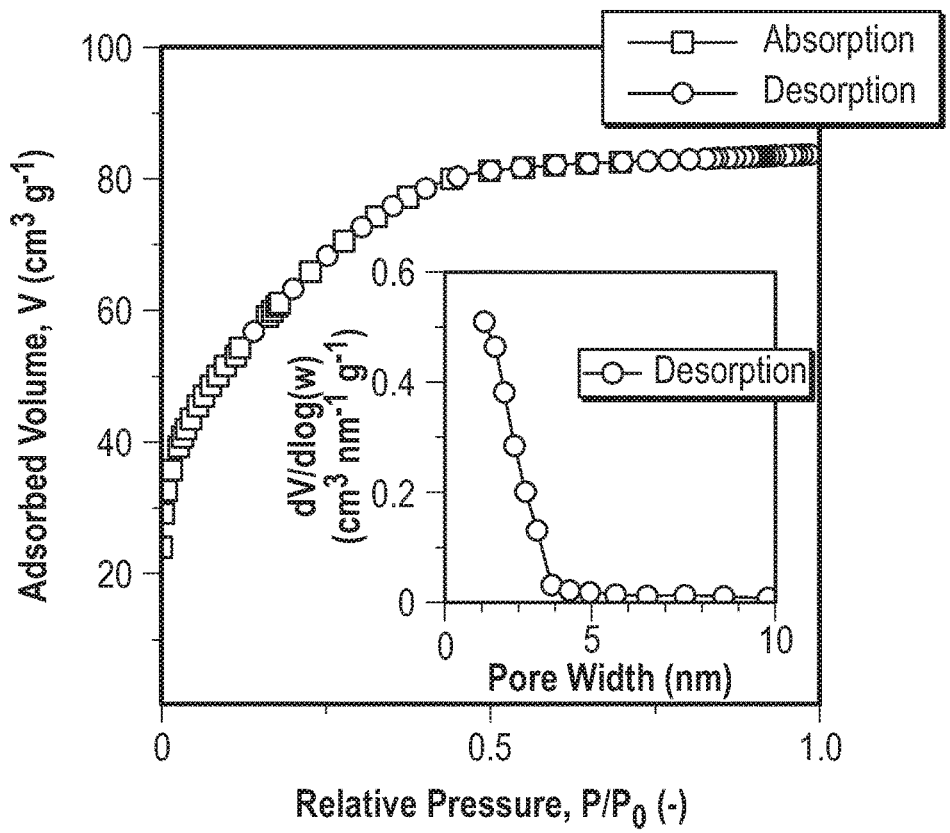
FIG. 17 illustrates the $N_2$ adsorption/desorption graph and BET pore size distribution curve for the porous carbon material.

FIG. 17 N$_2$ illustrates the gas isotherm (adsorption/desorption) graph measured at 77 K and (inset) the pore size distribution (PSD) curved based on BJH theory from the desorption isotherm.

Activated carbon, polytetrafluoroethylene (PTFE) binder, and acetylene black conductive additive were mechanically mixed with a 90:5:5 weight ratio. A 10-mm-diameter electrode pellet was fabricated from about 10 milligrams (mg) of the mixture by hydraulic pressing at 2000 pounds per square inch (psi). To enhance the wetting of the electrode in the electrochemical test, the electrode pellets were immersed in excess electrolyte under vacuum for 10 minutes (to remove the air in the void space), and then pressurized with N$_2$ at 150 psi to force the electrolyte into the pores. The process was carried out twice to ensure the electrolyte was thoroughly infiltrated.

Methods for Forming the Electrolytes

The electrolytes were prepared by dissolving redox-reactive slats or electrochemically inert salts in 18.2 MΩ water. The salts were obtained as follows: Potassium iodide (KI, 99%, Alfa Aesar), potassium bromide (KBr, 99.999%, Alfa Aesar), methyl viologen dichloride hydrate, MVCl$_2$ (1,1'-Dimethyl-4,4'-bipyridinium dichloride, 98%, Sigma Aldrich), heptyl viologen dibromide, HVBr$_2$ (1,1'-Diheptyl-4,4'-bipyridinium dibromide, 98%, TCI AMERICA), potassium sulfate (K$_2$SO$_4$, 99.99%, Alfa Aesar), potassium ferrocyanide (K$_4$[Fe(CN)$_6$.3H$_2$O], Mallinckrodt), hexaammineruthenium (III) chloride (Ru(NH$_3$)$_6$Cl$_3$, 99%, Strem Chemicals). Tris(2,2'-dipyridyl)dichlorocobalt (Co(Bpy)$_3$Cl$_2$) was prepared by literature methods.

Analytical Electrochemistry Measurements

All electrochemical measurements were performed with a potentiostat/galvanostat (SP-300, Bio-logic). Redox-enhanced electrolytes were first studied using a standard three-electrode configuration with a Pt or GC working electrode. Electrode discs were hand-polished for 30 s using 0.25 µm alumina/water slurry on Buehler microcloth. The electrode was then rinsed and sonicated in 18.2 MΩ water for 30 s. A coiled Pt wire and saturated calomel electrode (SCE, Fisher Scientific) served as the counter and reference, respectively. Test solutions (10 ml) were sparged with $N_2$ for 10 min to remove dissolved $O_2$.

Three-Electrode Cell Design

The three-electrode cell was built from a perfluoroalkoxy (PFA) T-shaped Swagelock fitting and used insulated GC current collectors (FIG. S1a). Between the activated carbon pellets, a paper separator (Whatman Qualitative filter paper, Grade 1) was inserted to prevent direct electrical contact between electrodes. The electrodes/separator were soaked in test electrolyte (de-aerated by flowing $N_2$ gas for 10 min prior to use), and pressed in-between two current-collector rods. The cell was then flooded with 0.4-0.5 ml of excess electrolyte. The rods were made of a GC plate (3 mm thick, type 2, Alfa Aesar) bonded to Ni (Nickel Alloy 200, McMaster) body with the sides insulated with non-conducting epoxy (Stycast 1266, Emerson and Cuming). Before each test, the GC surface was polished as with the analytical electrochemistry. The use of GC avoids potential complications due to background corrosion of, e.g., stainless steel current collectors often used in Swagelock cells. A SCE reference electrode placed with the tip at the edge of the separator was incorporated to allow for independent measurement of the absolute potential at each electrode. The cell exterior was purged with wet $N_2$ during voltammetry and constant-current charge/discharge cycling.

Cell Design for Specific Energy and Power Measurements

An 11.3-mm-wide cylindrical chamber machined from inert plastic (Kel-F) served as the cell housing. Two GC discs tightly fit with o-ring seals and back-contacted with Cu wire served as the current collectors. The separator (Polycarbonate membrane filter, STERLITECH) was cut into a disc with an identical diameter as the chamber. The electrodes were 10-mm diameter pellets, fabricated as described above.

Hybrid Energy Device Example

As discussed herein, the two redox couples are used in the redox-enhanced electrolyte for an EDLC device that includes two porous carbon electrodes. However, in one example, a hybrid energy device can include an EDLC porous carbon anode and a battery-like solid-state $MnO_2$ cathode. In that example, a viologen redox couple can be included within the electrolyte to enhance the performance of the anode. For example, the performance enhancement can include similar advantages for those described above in regards to the EDLC that included the viologen and the porous carbon electrode.

Control/Comparison Devices

Figure 18A:
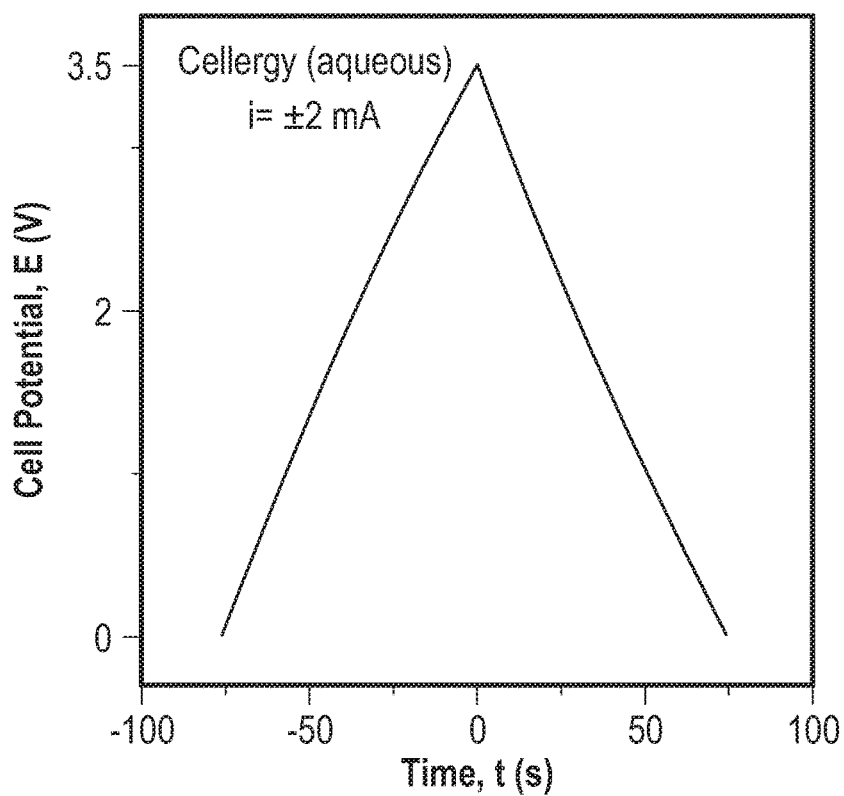
FIG. 18A illustrates the galvano static charge/discharge profile for an aqueous-based commercial supercapacitor.
Figure 18B:
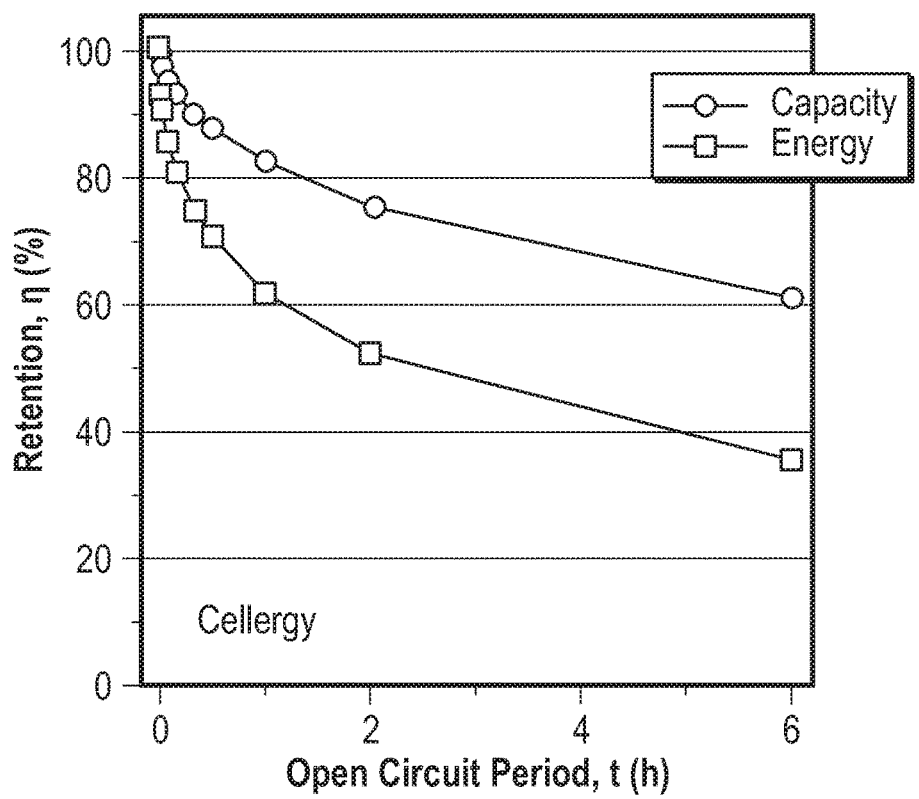
FIG. 18B illustrates the self-discharge data for the aqueous-based commercial supercapacitor.
Figure 19A:
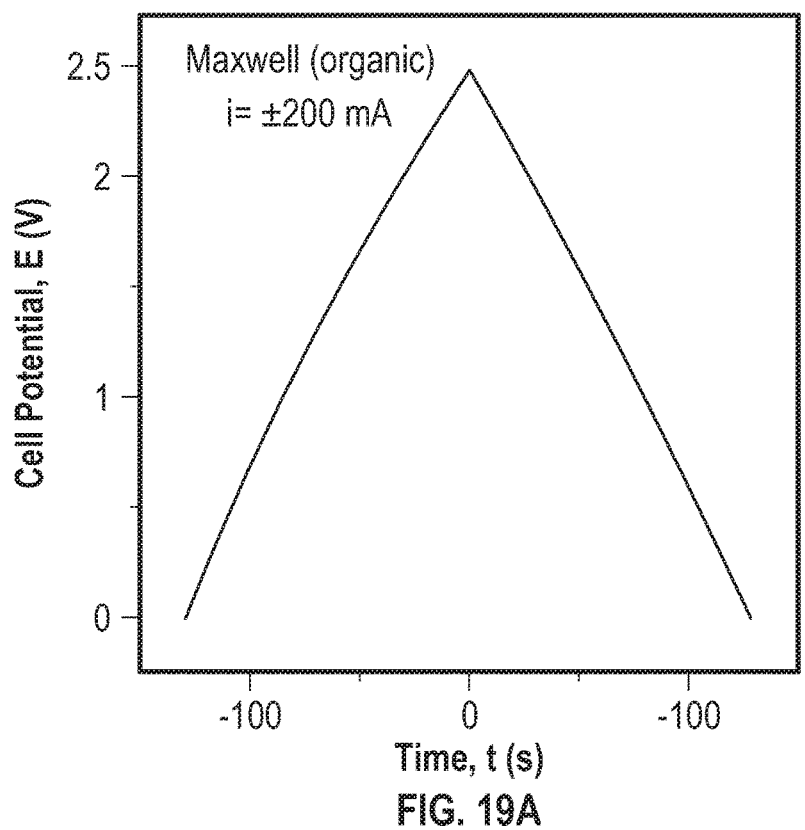
FIG. 19A illustrates the galvanostatic charge/discharge profile for an organic based commercial supercapacitor.
Figure 19B:
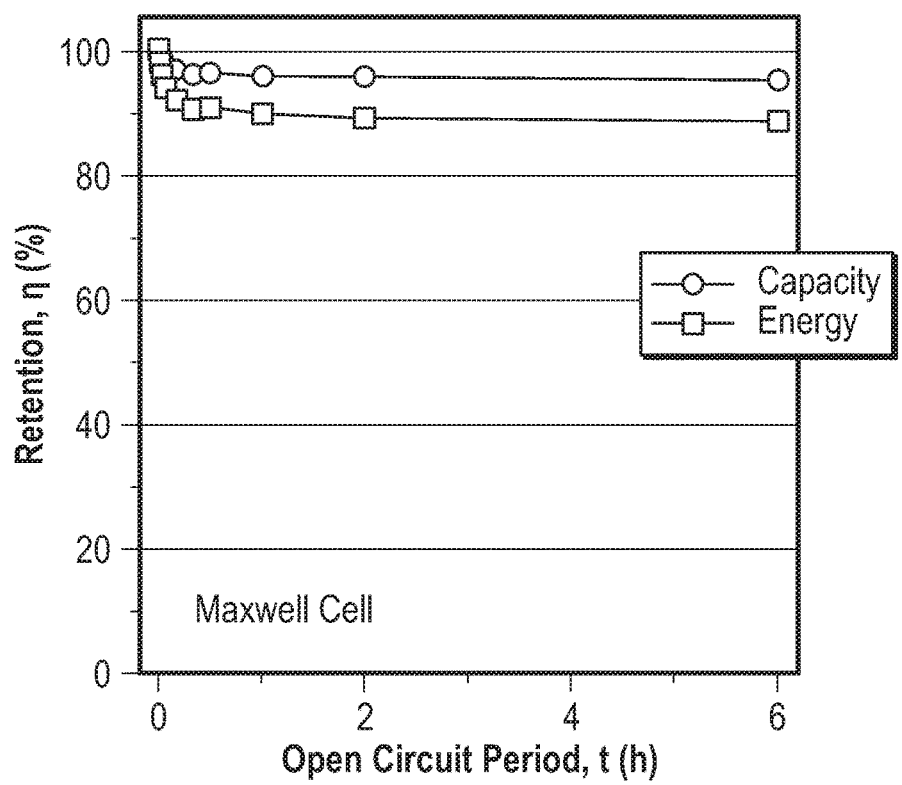
FIG. 19B illustrates the self-discharge data for the organic based commercial supercapacitor.
Figure 20A:
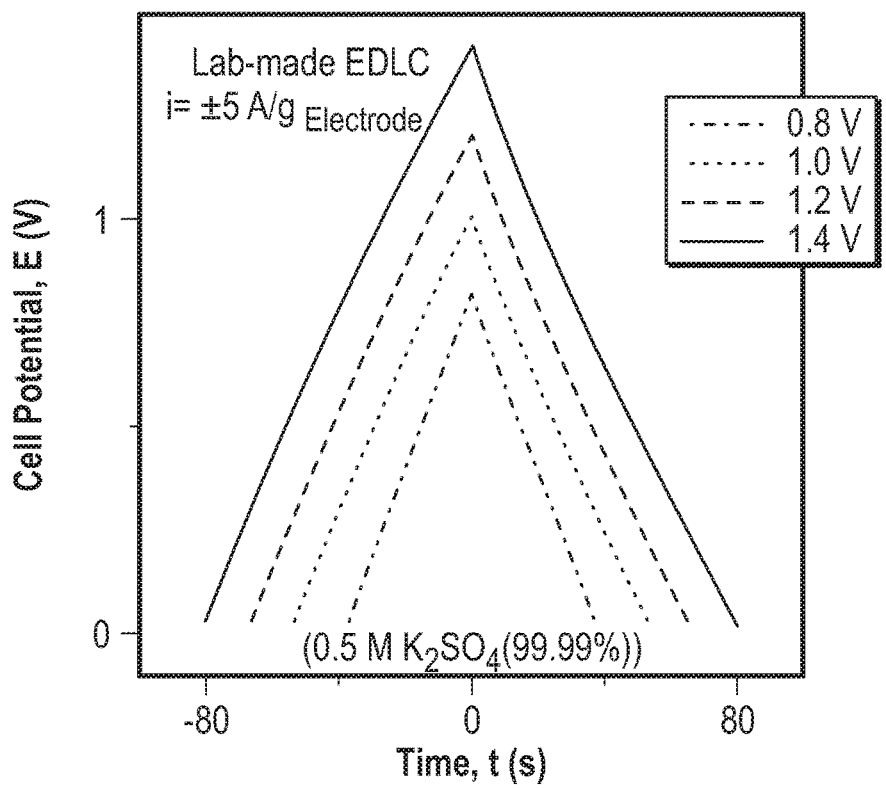
FIG. 20A illustrates the galvanostatic charge/discharge profile for a lab-made EDLC composed of $CO_2$ activated carbon electrodes and 0.5 M $K_2SO_4$ (99.99% pure) solution.
Figure 20B:
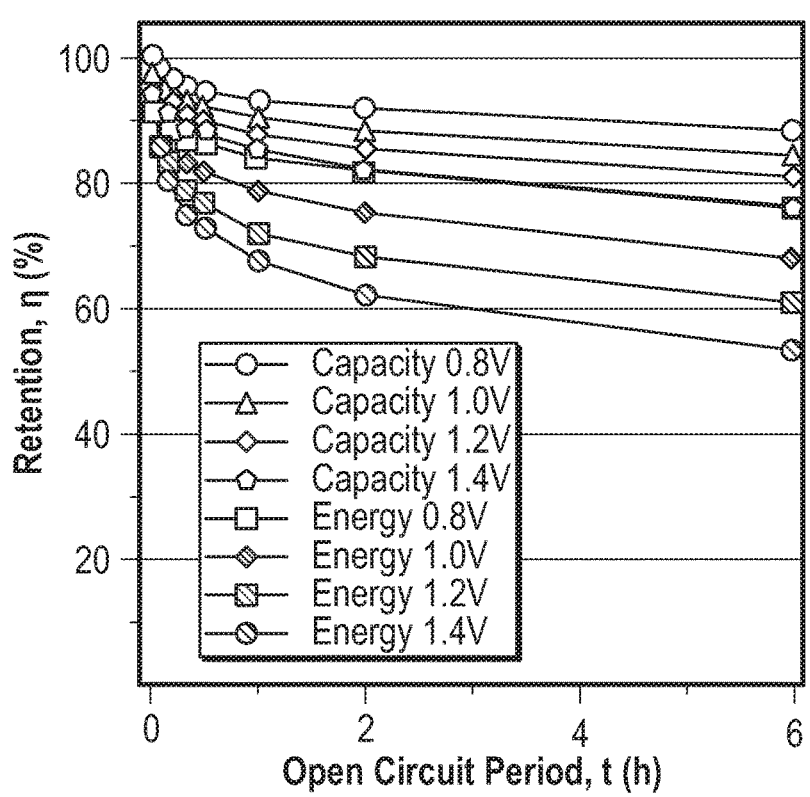
FIG. 20B illustrates the self-discharge data for the lab-made EDLC composed of $CO_2$ activated carbon electrodes and 0.5 M $K_2SO_4$ (99.99% pure) solution.

Commercial electrochemical capacitors were tested to provide reference self-discharge and performance data (FIGS. 18A-B, 19A-B, and 20A-B). FIGS. 18A, 19A, and 20A illustrate the galvanostatic charge/discharge profiles for an aqueous-based commercial supercapacitor (Cellergy, CLG03P025L12), an organic-based commercial supercapacitor (Maxwell, BCAP0010P270 T01), and a lab-made EDLC composed of $CO_2$ activated carbon electrodes and 0.5 M $K_2SO_4$ (99.99% pure) solution, respectively. FIGS. 18B, 19B, and 20B illustrate the self-discharge date for the aqueous-based commercial supercapacitor (Cellergy, CLG03P025L12), the organic-based commercial supercapacitor (Maxwell, BCAP0010P270 T01), and the lab-made EDLC composed of $CO_2$ activated carbon electrodes and 0.5 M $K_2SO_4$ (99.99% pure) solution, respectively. Table 4 illustrates the specific capacity and energy density of the lab-made control EDLC (0.5 M $K_2SO_4$, 99.99% pure).

TABLE 4

Specific Capacity and Energy Density of Lab-Made control EDLC

| | 0.5M $K_2SO_4$ electrolyte (99.99% pure) | | | |
|---|---|---|---|---|
| Operating voltage | 0.8 V | 1.0 V | 1.2 V | 1.4 V |
| Specific capacity | 1.4 mAh $g_{wet}^{-1}$ (5.2 mAh $g_{dry}^{-1}$) | 2.0 mAh $g_{wet}^{-1}$ (7.5 mAh $g_{dry}^{-1}$) | 2.4 mAh $g_{wet}^{-1}$ (9.1 mAh $g_{dry}^{-1}$) | 2.9 mAh $g_{wet}^{-1}$ (11.0 mAh $g_{dry}^{-1}$) |
| Energy density | 0.5 Wh $kg_{wet}^{-1}$ (2 Wh $kg_{dry}^{-1}$) | 0.9 Wh $kg_{wet}^{-1}$ (3.5 Wh $kg_{dry}^{-1}$) | 1.4 Wh $kg_{wet}^{-1}$ (5.1 Wh $kg_{dry}^{-1}$) | 1.9 Wh $kg_{wet}^{-1}$ (7.1 Wh $kg_{dry}^{-1}$) |

The specific capacity and energy of the lab-made EDLC (0.5 M $K_2SO_4$, 99.99% pure) is normalized by combined mass of electrodes and electrolyte at different operating potentials. The values indicated as $g_{dry}$ are normalized to the combined "dry" electrode mass. The values referred as $g_{wet}$ are based on the mass of both electrodes and electrolyte.

Additional Notes

The above detailed description includes references to the accompanying drawings, which form a part of the detailed description. The drawings show, by way of illustration, specific embodiments in which the invention can be practiced.

These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An energy storage device, comprising:
   an electrical double layer capacitor (EDLC) including at least two electrodes separated by a redox-enhanced electrolyte having an integral active component for storing a charge;
   wherein the redox-enhanced electrolyte includes at least two redox couples, such that there is a different one of the redox couples for each of the electrodes;
   wherein, when charged, the charge is stored in Faradaic reactions with the at least two redox couples in the electrolyte and in a double-layer capacitance of a porous carbon material that comprises at least one of the electrodes; and
   wherein a self-discharge of the energy storage device is mitigated by at least one of electrostatic attraction, adsorption, physisorption, and chemisorption of a redox couple onto the porous carbon material.

2. The energy storage device of claim 1, wherein the at least two redox couples are mixed into the electrolyte and the EDLC does not include an ion-selective separator.

3. The energy storage device of claim 1, wherein the at least two redox couples do not comprise a metal.

4. The energy storage device of claim 1, wherein at least one redox couple comprises a viologen.

5. The energy storage device of claim 1, wherein at least one redox couple comprises Bromine.

6. The energy storage device of claim 1, wherein the electrolyte is an aqueous, organic or ionic liquid.

7. The energy storage device of claim 1, wherein a PH of the redox-enhanced electrolyte, concentrations and ratios of the at least two redox couples, and/or a porosity of the porous carbon material, are adjusted to control an internal self-discharge of the electrical double layer capacitor.

8. The energy storage device of claim 1, wherein each of the at least two redox couples operates at a different potential.

9. The energy storage device of claim 1, wherein the redox couples comprise any couple with a standard reduction potential within an operating voltage window of the electrical double layer capacitor.

10. A method for fabricating an energy storage device, comprising:
    fabricating an electrical double layer capacitor (EDLC) including at least two electrodes separated by a redox-enhanced electrolyte that comprises an integral active component for charge storage,
    wherein:
       at least one electrode comprises is fabricated from porous conductive carbon material;
       the redox-enhanced electrolyte is fabricated to include at least two redox couples, such that there is a different one of the redox couples for each of the electrodes;
       charge is stored in Faradaic reactions with the at least two redox couples in the electrolyte; and
       the redox couples comprise compounds having properties selected to inhibit internal self-discharge within the electrical double layer capacitor.

11. The method of claim 10, further comprising adjusting a PH of the redox-enhanced electrolyte, concentrations and ratios of the at least two redox couples, and/or a porosity of the porous carbon material, to control an internal self-discharge of the electrical double layer capacitor.

12. The method of claim 10, wherein the redox couples comprise compounds selected for their ability to mitigate self discharge of the device via electrostatic attraction adsorption, physisorption and/or chemisorption onto the porous conductive carbon material.

13. The method of claim 10, wherein:
    (a) the device does not comprise an ion-selective separator;
    (b) the at least two redox couples do not comprise a metal;
    (c) at least one redox couple comprises a viologen; and/or
    (d) the electrolyte is an aqueous liquid.

14. The method of claim 10, wherein the device delivers an energy density of at least at least 10 Wh kg-1 based on the mass of electrodes and electrolyte.

15. The method of claim 10, wherein the device exhibits a self-discharge rate of less than 50 percent after three hours at open circuit.

16. A method of inhibiting internal self-discharge of an energy storage device, wherein the device comprises:
    at least two electrodes, wherein at least one electrode comprises a porous carbon material; and
    an aqueous redox-enhanced electrolyte comprising a first redox active compound and a second redox active compound, wherein the electrolyte functions as an active component for charge storage, the method comprising:
       allowing the first redox active compound and/or the second redox active compound to adsorb to the porous carbon material via electrostatic attraction adsorption, physisorption and/or chemisorption, thereby mitigating self-discharge of the device so that internal self-discharge of the energy storage device in inhibited.

17. The method of claim 16, wherein the device is an electrical double layer capacitor.

18. The method of claim 16, wherein the device does not include an ion-selective separator.

19. The method of claim 16, wherein a first redox active couple and a second redox active compound do not include a metal other than potassium.

20. The method of claim 16, wherein at least one redox active compound includes a viologen.

\* \* \* \* \*